US012463732B2

(12) United States Patent
Drogi et al.

(10) Patent No.: US 12,463,732 B2
(45) Date of Patent: *Nov. 4, 2025

(54) ERROR VECTOR MAGNITUDE EXCLUSION PERIOD FOR ESTABLISHING COMPLIANCE OF USER EQUIPMENT WITH A TRANSIENT PERIOD

(71) Applicant: Skyworks Solutions, Inc., Irvine, CA (US)

(72) Inventors: Serge Francois Drogi, Flagstaff, AZ (US); Laurent Noel, Laval (CA); Dominique Michel Yves Brunel, Antibes (FR)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,119

(22) Filed: Jan. 18, 2024

(65) Prior Publication Data

US 2024/0259115 A1    Aug. 1, 2024

Related U.S. Application Data

(60) Provisional application No. 63/480,756, filed on Jan. 20, 2023.

(51) Int. Cl.
*H04B 17/17* (2015.01)
*H04B 17/00* (2015.01)
(Continued)

(52) U.S. Cl.
CPC ......... *H04B 17/17* (2015.01); *H04B 17/0085* (2013.01); *H04B 17/336* (2015.01); *H04W 24/08* (2013.01); *H04L 27/2614* (2013.01)

(58) Field of Classification Search
CPC .. H04B 17/17; H04B 17/0085; H04B 17/336; H04W 24/08; H04W 24/06;
(Continued)

(56) References Cited

U.S. PATENT DOCUMENTS 10,145,878 B2   12/2018   Brunel et al.
10,236,966 B2   3/2019    Brunel et al.
(Continued)

OTHER PUBLICATIONS

Skyworks Solutions et al., "Proposal for DFT-S-OFDM Transient Period Capability Requirements and Testability", 3GPP Draft; R4-1915296, 3rd Generation Partnership Project (3GPP), Mobiel Competence Centre; 650, Route Des Lucioles; F-06921 Sophia-Antipolis Cedex; France, vol. RAN WG4, No. Reno, USA; Nov. 18, 2019-Nov. 22, 2019, XP051819512 (2019).
(Continued)

*Primary Examiner* — Vineeta S Panwalkar
(74) *Attorney, Agent, or Firm* — Knobbe, Martens, Olson & Bear, LLP

(57) ABSTRACT

Apparatus and methods for testing error vector magnitude (EVM) exclusion periods are disclosed. In certain embodiments, a method includes transmitting a first symbol with a first resource block allocation using a transmit chain of a mobile device and transmitting a second symbol with a second resource block allocation different than the first resource block allocation using the transmit chain, the first symbol and the second symbol having a power transient separated by a transient period. The method further includes establishing that the mobile device complies with a transient period specification based on obtaining a first error vector magnitude measurement and a second error vector magnitude measurement when the mobile device is transmitting a symbol sequence that includes the first symbol and the second symbol, the second error vector magnitude measure-
(Continued)

ment delayed from the first error vector magnitude measurement by an error vector measurement exclusion period.

20 Claims, 23 Drawing Sheets

(51) Int. Cl.
    *H04B 17/336*     (2015.01)
    *H04W 24/08*     (2009.01)
    *H04L 27/26*     (2006.01)

(58) Field of Classification Search
    CPC ................. H04L 27/2614; H04L 1/206; H04L 27/26025; H04L 27/2607; H04L 27/265
    See application file for complete search history.

(56) References Cited

U.S. PATENT DOCUMENTS

| | | | |
|---|---|---|---|
| 10,381,983 | B2 | 8/2019 | Balteanu et al. |
| 10,439,789 | B2 | 10/2019 | Brunel et al. |
| 10,536,116 | B2 | 1/2020 | Balteanu et al. |
| 10,560,139 | B2 | 2/2020 | Brunel et al. |
| 10,670,644 | B2 | 6/2020 | Brunel et al. |
| 10,812,023 | B2 | 10/2020 | Balteanu et al. |
| 10,862,661 | B2 | 12/2020 | Brunel et al. |
| 10,924,164 | B2 | 2/2021 | Brunel et al. |
| 10,972,055 | B2 | 4/2021 | Naraine et al. |
| 11,165,477 | B2 | 11/2021 | Brunel et al. |
| 11,239,800 | B2 | 2/2022 | Drogi et al. |
| 11,245,552 | B2 | 2/2022 | Brunel et al. |
| 11,323,158 | B2 | 5/2022 | Brunel et al. |
| 11,374,538 | B2 | 6/2022 | Drogi et al. |
| 11,444,576 | B2 | 9/2022 | Drogi et al. |
| 11,489,655 | B2 | 11/2022 | Brunel et al. |
| 11,563,469 | B2 | 1/2023 | Brunel et al. |
| 11,595,005 | B2 | 2/2023 | Balteanu et al. |
| 11,601,247 | B2 | 3/2023 | Brunel et al. |
| 11,683,013 | B2 | 6/2023 | Drogi et al. |
| 11,728,775 | B2 | 8/2023 | Drogi et al. |
| 11,770,104 | B2 | 9/2023 | Balteanu et al. |
| 11,770,228 | B2 | 9/2023 | Brunel et al. |
| 11,777,544 | B2 | 10/2023 | Drogi et al. |
| 11,784,611 | B2 | 10/2023 | Naraine et al. |
| 11,818,665 | B2 * | 11/2023 | Lahteensuo ......... H04W 52/241 |
| 11,929,769 | B2 | 3/2024 | Drogi et al. |
| 11,956,108 | B2 | 4/2024 | Drogi et al. |
| 2020/0076488 | A1 | 3/2020 | Brunel |
| 2022/0014247 | A1 | 1/2022 | Brunel |
| 2022/0256475 | A1 | 8/2022 | Lahteensuo et al. |
| 2022/0302935 | A1 | 9/2022 | Drogi |
| 2022/0311458 | A1 | 9/2022 | Brunel |
| 2022/0311459 | A1 | 9/2022 | Pan et al. |
| 2022/0311469 | A1 | 9/2022 | Brunel et al. |
| 2022/0312348 | A1 | 9/2022 | Drogi |
| 2022/0321152 | A1 | 10/2022 | Brunel |
| 2022/0385249 | A1 | 12/2022 | Brunel et al. |
| 2022/0385331 | A1 | 12/2022 | Balteanu et al. |
| 2022/0407571 | A1 | 12/2022 | Drogi et al. |
| 2022/0407755 | A1 | 12/2022 | Drogi et al. |
| 2023/0208044 | A1 | 6/2023 | Brunel et al. |
| 2023/0208455 | A1 | 6/2023 | Brunel et al. |
| 2023/0216192 | A1 | 7/2023 | Pehlke et al. |
| 2023/0344387 | A1 | 10/2023 | Drogi et al. |
| 2023/0412126 | A1 | 12/2023 | Balteanu et al. |
| 2024/0056250 | A1 | 2/2024 | Brunel |
| 2024/0063757 | A1 | 2/2024 | Naraine et al. |
| 2024/0079998 | A1 | 3/2024 | Drogi et al. |
| 2024/0080005 | A1 | 3/2024 | Drogi et al. |
| 2024/0113671 | A1 | 4/2024 | Drogi et al. |
| 2024/0250761 | A1 | 7/2024 | Drogi et al. |

OTHER PUBLICATIONS

Skyworks Solutions et al., "EVM Measurements for FR1 Transient Period Capability Testability", 3GPP Draft; R4-2002143, 3rd Generation Partnership Project (3GPP), Mobile Competence Centre, 650, Route Des Lucioles; F-06921 Sophia-Antipolis Cedex, France, vol. RAN WG4, No. online; Feb. 24, 2020-Mar. 6, 2020, XP052405304 (2020).

3GPP TS 38.521-2, V16.3.0, 3rd Generation Partnership Project; Technical Specification Group Radio Access Network; NR; User Equipment (UE) conformance specification; Radio transmission and reception; Part 2: Range 2 Standalone (Release 16), in 497 pages, downloaded on Mar. 31, 2020.

Skyworks Solutions, Inc., "EVM Measurements for FR1 Transient Period Capability Testability", 3GPP TSG-RAN WG4 Meeting #94-e online, Feb. 24-Mar. 6, 2020, R4-2002143, downloaded on Feb. 25, 2020, in 13 pages.

Skyworks Solutions, Inc. "Proposal on Transient Period Signaling Values", 3GPP TSG-RAN4 Meeting #93, Reno, USA, Nov. 18-22, 2019, R4-1915299, in 2 pages (2019).

Skyworks Solutions, Inc., "WF on Transient period capability", 3GPP Tsg-Ran WG4 Meeting #93, Reno, Nevada, R4-1916016, downloaded on Nov. 25, 2019, in 17 pages (2019).

Skyworks Solutions, Inc., "Proposal for CP-OFDM Transient Period Capability Requirements and Testability", 3GPP TSG-RAN4 Meeting #93, Reno, Nevada, Nov. 18-22, 2019, R4-1915298, in 4 pages (2019).

* cited by examiner

| SCS (kHz) | tp=7μs<br>tp_start=−2.7μs | tp=4μs<br>tp_start=−1.0μs | tp=2μs<br>tp_start=−0.5μs |
|---|---|---|---|
| 15 | ✓ | ✓ | ✓ |
| 30 | ✗ | ✗ | ✓ |
| 60 | ✗ | ✗ | ✓ |

FIG.5C

| Reported transient capability (μs) | EVM definition | $tp_{start}$ (μs) | SCS |
|---|---|---|---|
| 2 | $EVM_{after} = min(\overline{EVM_{l\_tp}}, \overline{EVM_h})$<br>$EVM_{before} = max(\overline{EVM_l}, \overline{EVM_{h\_tp}})$ | −0.5 | 60kHz |

FIG.5E

| Reported transient capability ($\mu s$) | EVM definition | $tp_{start}(\mu s)$ | SCS |
|---|---|---|---|
| 1 | $EVM_{after}=max(\overline{EVM_{l\_tp}},\overline{EVM_h})$ <br> $EVM_{before}=max(\overline{EVM_l},\overline{EVM_{h\_tp}})$ | −0.25 | 60kHz |

FIG.5G

| Reported transient capability (μs) | EVM definition | tp start (μs) | SCS | 256QAM EVM symbol #13 | 256QAM EVM symbol #0 | 64QAM EVM symbol #13 | 64QAM EVM symbol #0 |
|---|---|---|---|---|---|---|---|
| 4 | $EVM_{after} = \max(\overline{EVM_{l\_tp}}, \overline{EVM_h})$ $EVM_{before} = \max(\overline{EVM_l}, \overline{EVM_{h\_tp}})$ | -1.0 | 30kHz | 8% | 10% | 5% | 7% |

FIG.51

| Reported transient capability ($\mu s$) | EVM definition | $tp_{start}(\mu s)$ | SCS |
|---|---|---|---|
| 2 | $EVM_{after} = min(\overline{EVM_{l\_tp}}, \overline{EVM_h})$<br>$EVM_{before} = max(\overline{EVM_l}, \overline{EVM_{h\_tp}})$ | $-0.5$ | 60kHz |
| 1 | $EVM_{after} = max(\overline{EVM_{l\_tp}}, \overline{EVM_h})$<br>$EVM_{before} = max(\overline{EVM_l}, \overline{EVM_{h\_tp}})$ | $-0.25$ | 120kHz |
| 0.5 | $EVM_{after} = max(\overline{EVM_{l\_tp}}, \overline{EVM_h})$<br>$EVM_{before} = max(\overline{EVM_l}, \overline{EVM_{h\_tp}})$ | $-0.125$ | 480kHz |
| 0.5 | $EVM_{after} = max(\overline{EVM_{l\_tp}}, \overline{EVM_h})$<br>$EVM_{before} = max(\overline{EVM_l}, \overline{EVM_{h\_tp}})$ | $-0.125$ | 960kHz |
| 0.25 | $EVM_{after} = max(\overline{EVM_{l\_tp}}, \overline{EVM_h})$<br>$EVM_{before} = max(\overline{EVM_l}, \overline{EVM_{h\_tp}})$ | $-0.0625$ | 480KHz |
| 0.125 | $EVM_{after} = max(\overline{EVM_{l\_tp}}, \overline{EVM_h})$<br>$EVM_{before} = max(\overline{EVM_l}, \overline{EVM_{h\_tp}})$ | $-0.03125$ | 960kHz |

FIG.5K

| SCS [kHz] | EVM definition | tp [$\mu s$] |
|---|---|---|
| 60 | $EVM_{after} = \min(\overline{EVM_l}, \overline{EVM_h})$<br>$EVM_{before} = \max(\overline{EVM_l}, \overline{EVM_h})$ | 1.7 |
| 120 | $EVM_{after} = \max(\overline{EVM_l}, \overline{EVM_h})$<br>$EVM_{before} = \max(\overline{EVM_l}, \overline{EVM_h})$ | 0.8 |
| 480 | $EVM_{after} = \max(\overline{EVM_l}, \overline{EVM_h})$<br>$EVM_{before} = \max(\overline{EVM_l}, \overline{EVM_h})$ | 0.6 |
| 960 | $EVM_{after} = \max(\overline{EVM_l}, \overline{EVM_h})$<br>$EVM_{before} = \max(\overline{EVM_l}, \overline{EVM_h})$ | 0.5 |

FIG.5M

ERROR VECTOR MAGNITUDE EXCLUSION PERIOD FOR ESTABLISHING COMPLIANCE OF USER EQUIPMENT WITH A TRANSIENT PERIOD

CROSS-REFERENCE TO RELATED APPLICATIONS

This application claims the benefit of priority under 35 U.S.C. § 119 of U.S. Provisional Patent Application No. 63/480,756, filed Jan. 20, 2023 and titled "ERROR VECTOR MAGNITUDE EXCLUSION PERIOD FOR ESTABLISHING COMPLIANCE OF USER EQUIPMENT WITH A TRANSIENT PERIOD," which is herein incorporated by reference in its entirety.

BACKGROUND

Field

Embodiments of the invention relate to electronic systems, and in particular, to radio frequency (RF) electronics.

Description of the Related Technology

Radio frequency (RF) communication systems wirelessly communicate RF signals using antennas.

Examples of RF communication systems include, but are not limited to mobile phones, tablets, base stations, network access points, laptops, and wearable electronics. RF signals have a frequency in the range from about 30 kHz to 300 GHz, for instance, in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

SUMMARY

In certain embodiments, the present disclosure relates to a method of testing fifth generation cellular user equipment. The method incudes transmitting a first symbol with a first resource block allocation using a transmit chain of a mobile device and transmitting a second symbol with a second resource block allocation different than the first resource block allocation using the transmit chain. The first symbol and the second symbol have a power transient separated by a transient period. The method further includes establishing that the mobile device complies with a transient period specification based on obtaining a first error vector magnitude measurement and a second error vector magnitude measurement when the mobile device is transmitting a symbol sequence that includes the first symbol and the second symbol. The second error vector magnitude measurement is delayed from the first error vector magnitude measurement by an error vector measurement exclusion period.

In some embodiments, the method further includes establishing compliance with the transient period specification based on a minimum of the first error vector magnitude measurement and the second error vector magnitude measurement.

In various embodiments, the transient period is about 2 microseconds and the sub-carrier spacing of the second symbol is about 60 kilohertz.

In several embodiments, the method further includes setting the transient period to a particular value for a particular test case.

In a number of embodiments, the method further includes setting a window position for the first symbol into a cyclic prefix of the symbol sequence.

In some embodiments, the first symbol is longer than the second symbol.

In various embodiments, the error vector measurement exclusion period starts when the first symbol is still being transmitted.

In several embodiments, the sub-carrier spacing of the second symbol is greater than or equal to 60 kilohertz.

In some embodiments, the method further includes transmitting the symbol sequence over a frequency band in frequency range one of fifth generation.

In several embodiments, the method further includes transmitting the symbol sequence over a frequency band in frequency range two of fifth generation. According to a number of embodiments, a sub-carrier spacing the second symbol is one of 60 kilohertz, 120 kilohertz, 480 kilohertz, or 960 kilohertz. In accordance with various embodiments, the transient period is one of 2 microseconds, 1 microsecond, 500 nanoseconds, 250 nanoseconds, or 125 nanoseconds.

In some embodiments, the error vector measurement exclusion period is substantially equal to the transient period.

In several embodiments, the error vector measurement exclusion period is less than the transient period. According to a number of embodiments, establishing compliance with the transient period specification based on an error vector magnitude relaxation.

In various embodiments, obtaining the first error vector magnitude measurement includes performing a first fast Fourier transform on data captured when the mobile device is transmitting the first symbol, and obtaining the second error vector magnitude measurement includes performing a second fast Fourier transform on data captured when the mobile device is transmitting the second symbol.

In a number of embodiments, a ratio of the second resource block allocation to the first resource block allocation is at least twenty to one.

In several embodiments, the transmit chain of the mobile device includes a power amplifier and an antenna.

In various embodiments, the method is implemented using automated test equipment.

In some embodiments, the first error vector magnitude measurement is taken over a first time window and the second error vector magnitude measurement is taken over a second time window.

In certain embodiments, the present disclosure relates to automated test equipment for testing fifth generation cellular user equipment. The automated test equipment includes a measurement device configured to generate a receive signal in response to a mobile device transmitting a symbol sequence including a first symbol with a first resource block allocation and a second symbol with a second resource block allocation. The first symbol and the second symbol have a power transient separated by a transient period. The automated test equipment further includes a signal analyzer configured to analyze the receive signal to establish that the mobile device complies with a transient period specification based on obtaining a first error vector magnitude measurement and a second error vector magnitude measurement when the mobile device is transmitting the symbol sequence. The second error vector magnitude measurement is delayed from the first error vector magnitude measurement by an error vector measurement exclusion period.

In various embodiments, the signal analyzer is further configured to establish compliance based on determining a minimum of the first error vector magnitude measurement and the second error vector magnitude measurement.

In a number of embodiments, the transient period is about 2 microseconds and the sub-carrier spacing of the second symbol is about 60 kilohertz.

In several embodiments, the automated test equipment further includes a symbol scheduler configured to set the transient period to a particular value for a particular test case.

In some embodiments, the automated test equipment further includes a symbol scheduler configured to set a window position for the first symbol into a cyclic prefix of the symbol sequence.

In various embodiments, the first symbol is longer than the second symbol.

In several embodiments, the error vector measurement exclusion period starts when the first symbol is still being transmitted.

In some embodiments, the sub-carrier spacing of the second symbol is greater than or equal to 60 kilohertz.

In various embodiments, a frequency band of the receive signal is in frequency range one of fifth generation.

In several embodiments, a frequency band of the receive signal is in frequency range two of fifth generation. According to some embodiments, a sub-carrier spacing the second symbol is one of 60 kilohertz, 120 kilohertz, 480 kilohertz, or 960 kilohertz. In accordance with one or more embodiments, the transient period is one of 2 microseconds, 1 microsecond, 500 nanoseconds, 250 nanoseconds, or 125 nanoseconds.

In various embodiments, the error vector measurement exclusion period is substantially equal to the transient period.

In several embodiments, the error vector measurement exclusion period is less than the transient period. In a number of embodiments, the signal analyzer is further configured to establish compliance based on an error vector magnitude relaxation.

In some embodiments, the signal analyzer is further configured to obtain the first error vector magnitude measurement by performing a first fast Fourier transform on the receive signal when the mobile device is transmitting the first symbol, and to obtain the second error vector magnitude measurement by performing a second fast Fourier transform on the receive signal when the mobile device is transmitting the second symbol.

In various embodiments, a ratio of the second resource block allocation to the first resource block allocation is at least twenty to one.

In several embodiments, the automated test equipment further includes a handler configured to move the mobile device.

In some embodiments, the automated test equipment further includes a symbol scheduler configure to control the mobile device to transmit the symbol sequence.

In various embodiments, the first error vector magnitude measurement is taken over a first time window and the second error vector magnitude measurement is taken over a second time window.

In certain embodiments, the present disclosure relates to a method of testing fifth generation cellular user equipment. The method includes transmitting a radio frequency signal in fifth generation frequency range two using a transmit chain of a mobile device, the radio frequency signal including a symbol sequence that includes a first symbol and a second symbol having a power transient separated by a transient period. The method further includes establishing that the mobile device complies with a transient period specification based on obtaining a first error vector magnitude measurement and a second error vector magnitude measurement when the mobile device is transmitting the symbol sequence, the second error vector magnitude measurement delayed from the first error vector magnitude measurement by an error vector measurement exclusion period, and the first error vector magnitude measurement and the second error vector magnitude measurement being symmetrically shared across a symbol boundary between the first symbol and the second symbol.

In some embodiments, the method further includes establishing compliance with the transient period specification based on a minimum of the first error vector magnitude measurement and the second error vector magnitude measurement.

In several embodiments, the method further includes setting a window position for the first symbol into a cyclic prefix of the symbol sequence.

In various embodiments, a sub-carrier spacing the second symbol is one of 60 kilohertz, 120 kilohertz, 480 kilohertz, or 960 kilohertz.

In some embodiments, the transient period is one of 1.7 microseconds, 0.8 microseconds, 0.6 microseconds, or 0.5 microseconds.

In several embodiments, the error vector measurement exclusion period is substantially equal to the transient period.

In some embodiments, obtaining the first error vector magnitude measurement includes performing a first fast Fourier transform on data captured when the mobile device is transmitting the first symbol, and obtaining the second error vector magnitude measurement includes performing a second fast Fourier transform on data captured when the mobile device is transmitting the second symbol. According to a number of embodiments, compliance with the transient period specification is established using only two fast Fourier transforms.

In several embodiments, the transmit chain of the mobile device includes a power amplifier and an antenna configured to transmit the radio frequency signal.

In some embodiments, the first error vector magnitude measurement is taken over a first time window and the second error vector magnitude measurement is taken over a second time window.

In certain embodiments, the present disclosure relates to automated test equipment for testing fifth generation cellular user equipment. The automated test equipment includes a measurement device configured to generate a receive signal in response to a mobile device transmitting a radio frequency signal in fifth generation frequency range two, the radio frequency signal including a symbol sequence that includes a first symbol and a second symbol having a power transient separated by a transient period. The automated test equipment further includes a signal analyzer configured to analyze the receive signal to establish that the mobile device complies with a transient period specification based on obtaining a first error vector magnitude measurement and a second error vector magnitude measurement when the mobile device is transmitting the symbol sequence. The second error vector magnitude measurement is delayed from the first error vector magnitude measurement by an error vector measurement exclusion period, and the first error vector magnitude measurement and the second error vector magnitude measurement are symmetrically shared across a symbol boundary between the first symbol and the second symbol.

In some embodiments, the signal analyzer is further configured to establish compliance based on determining a minimum of the first error vector magnitude measurement and the second error vector magnitude measurement.

In several embodiments, the automated test equipment further includes a symbol scheduler configured to set the transient period to a particular value for a particular test case.

In various embodiments, the automated test equipment further includes a symbol scheduler configured to set a window position for the first symbol into a cyclic prefix of the symbol sequence.

In a number of embodiments, a sub-carrier spacing the second symbol is one of 60 kilohertz, 120 kilohertz, 480 kilohertz, or 960 kilohertz.

In several embodiments, the transient period is one of 1.7 microseconds, 0.8 microseconds, 0.6 microseconds, or 0.5 microseconds.

In various embodiments, the error vector measurement exclusion period is substantially equal to the transient period.

In some embodiments, the signal analyzer is further configured to obtain the first error vector magnitude measurement by performing a first fast Fourier transform on the receive signal when the mobile device is transmitting the first symbol, and to obtain the second error vector magnitude measurement by performing a second fast Fourier transform on the receive signal when the mobile device is transmitting the second symbol. According to a number of embodiments, compliance with the transient period specification is established using only two fast Fourier transforms.

In several embodiments, the automated test equipment further includes a handler configured to move the mobile device.

In various embodiments, the automated test equipment further includes a symbol scheduler configure to control the mobile device to transmit the symbol sequence.

In some embodiments, the first error vector magnitude measurement is taken over a first time window and the second error vector magnitude measurement is taken over a second time window.

BRIEF DESCRIPTION OF THE DRAWINGS

FIG. 5C depicts one example of testing scenarios for various transient period and sub-carrier spacing (SCS) values.

FIG. 5E is a table of EVM definition for the first example of starting power transient and SCS values.

FIG. 5G is a table of EVM definition for the second example of starting power transient and SCS values.

FIG. 5I is a table of EVM definition for the third example of starting power transient and SCS values.

FIG. 5K is a table of one embodiment of EVM definitions for various examples of starting power transient and SCS values in FR2 frequency bands.

FIG. 5M is a table of another embodiment of EVM definitions for various examples of starting power transient and SCS values in FR2 frequency bands.

DETAILED DESCRIPTION OF EMBODIMENTS

Figure 1:
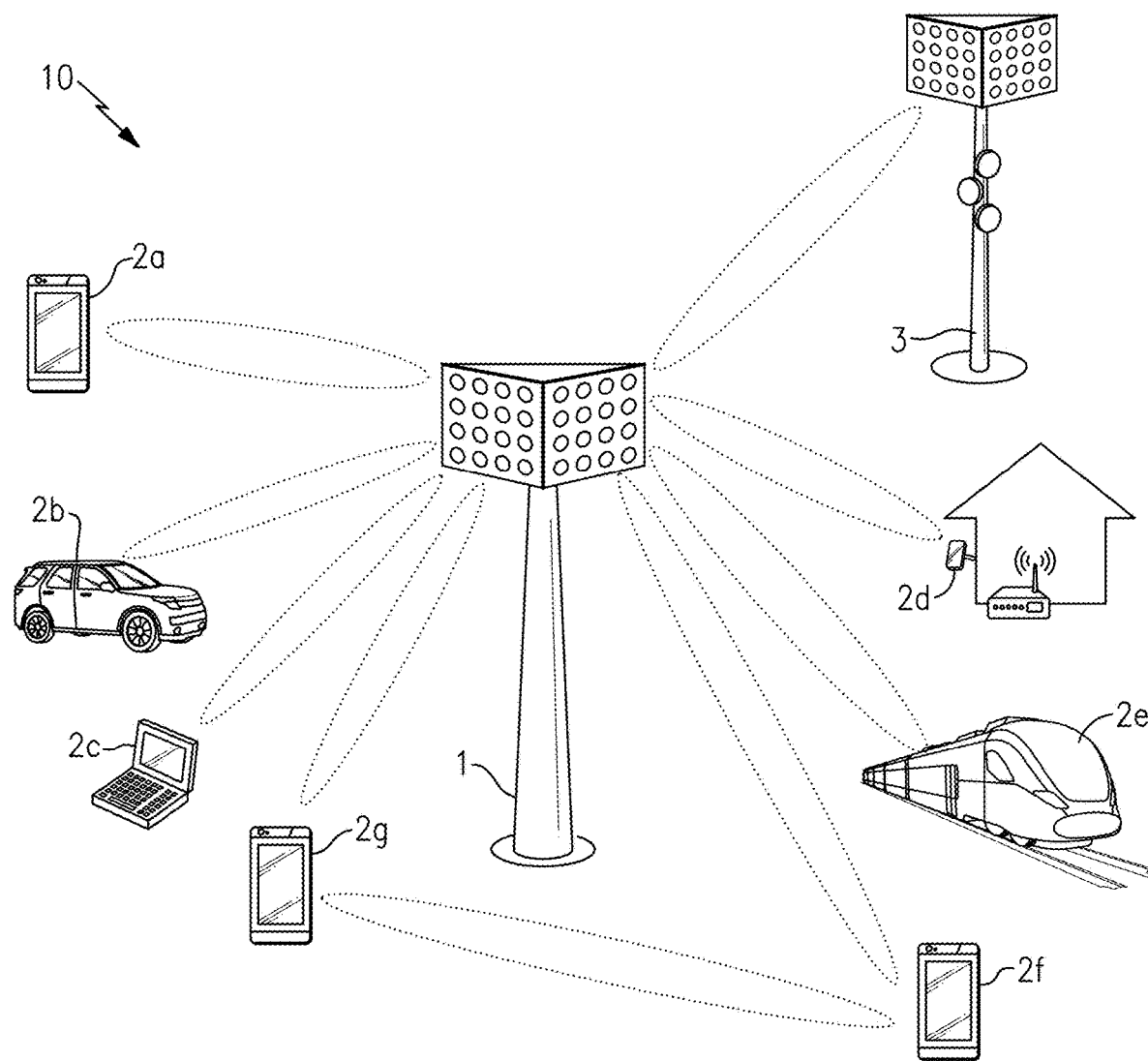
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6

GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands which include 5G FR2. Thus, as used herein a millimeter wave signal can include traditional millimeter waves (30 GHz to 300 GHz) as well as upper centimeter wave frequencies in the range of 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHZ).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IOT) applications.

The communication network 10 of FIG. 1 can be used to support a wide variety of advanced communication features, including, but not limited to, eMBB, uRLLC, and/or mMTC.

Figure 2A:
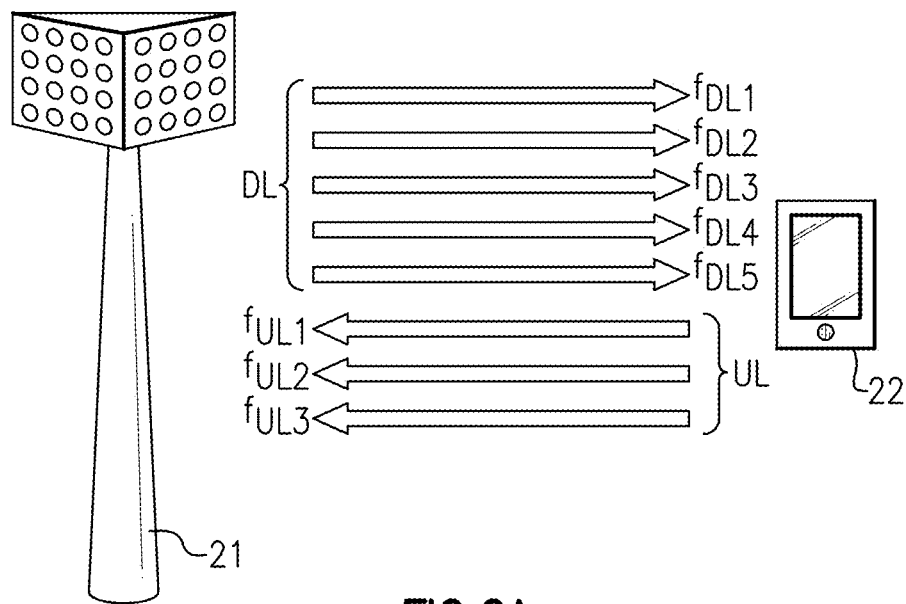
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
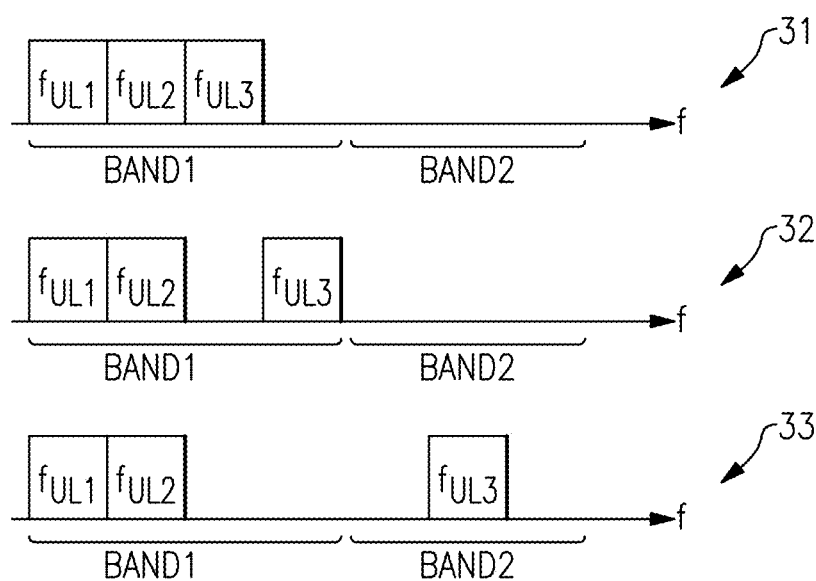
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
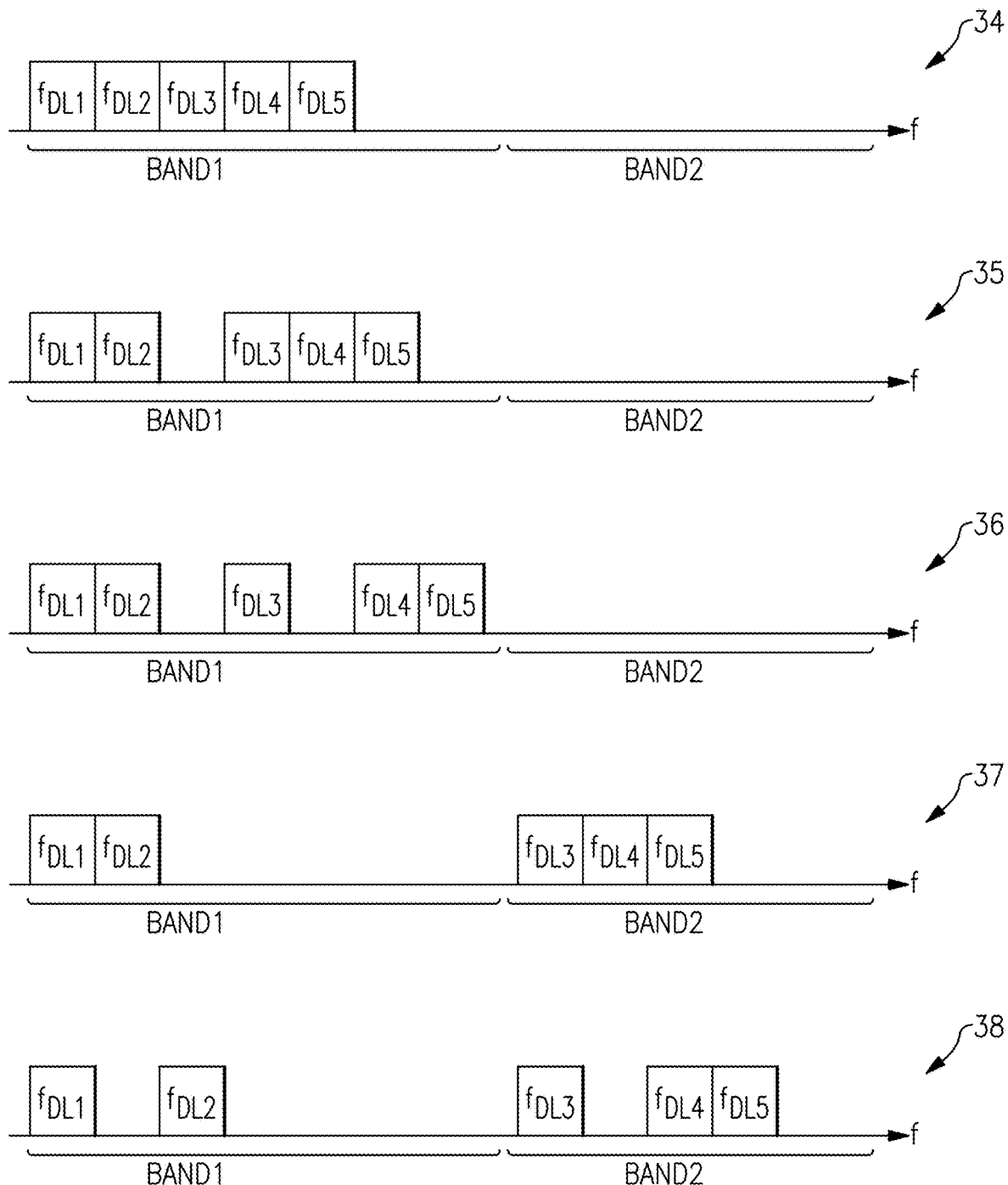
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 MHz to 5925 MHz) and/or a 6 GHz band (5925 MHz to 7125 MHZ).

Figure 3A:
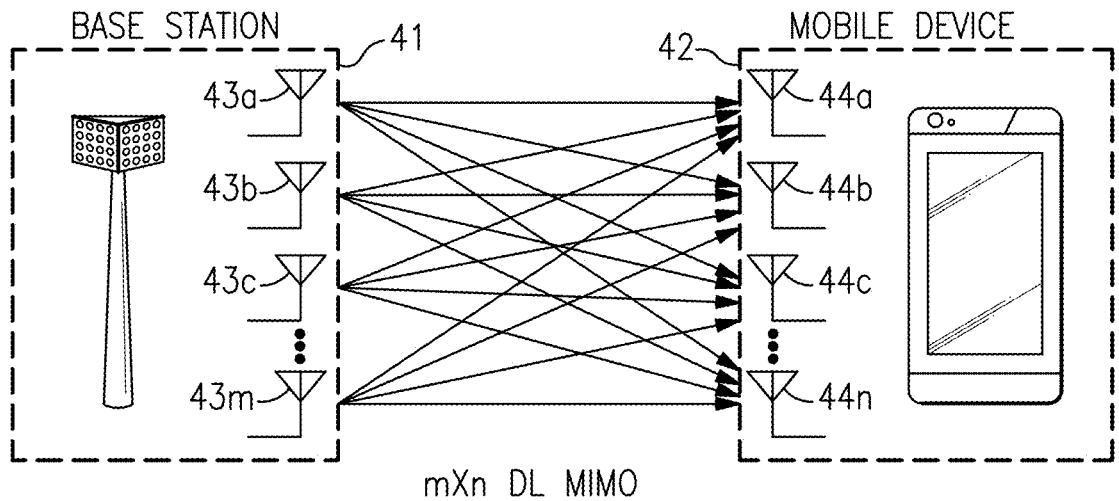
FIG. 3A is a schematic diagram of one example of a downlink channel using multi-input and multi-output (MIMO) communications.
Figure 3B:
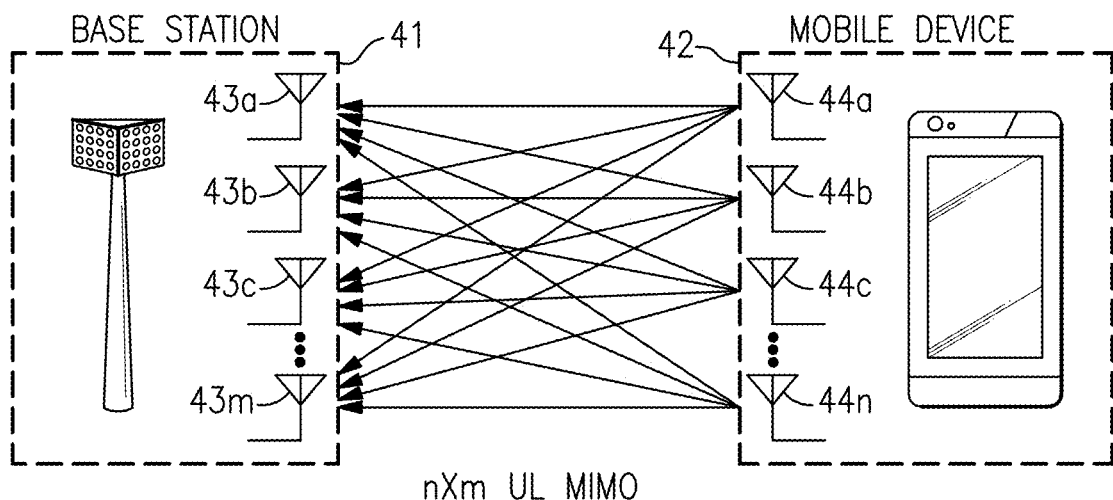
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
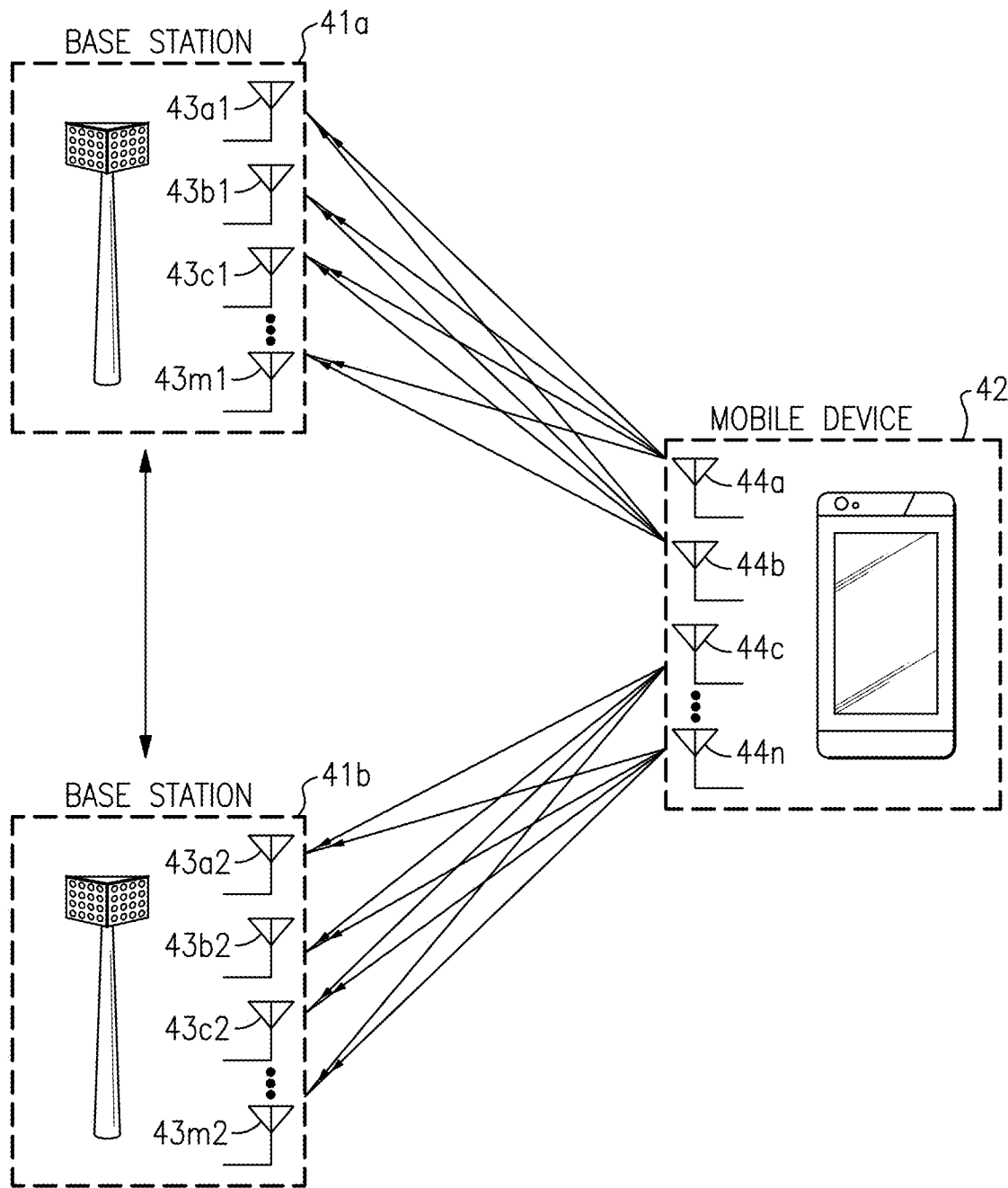
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additional a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Figure 4A:
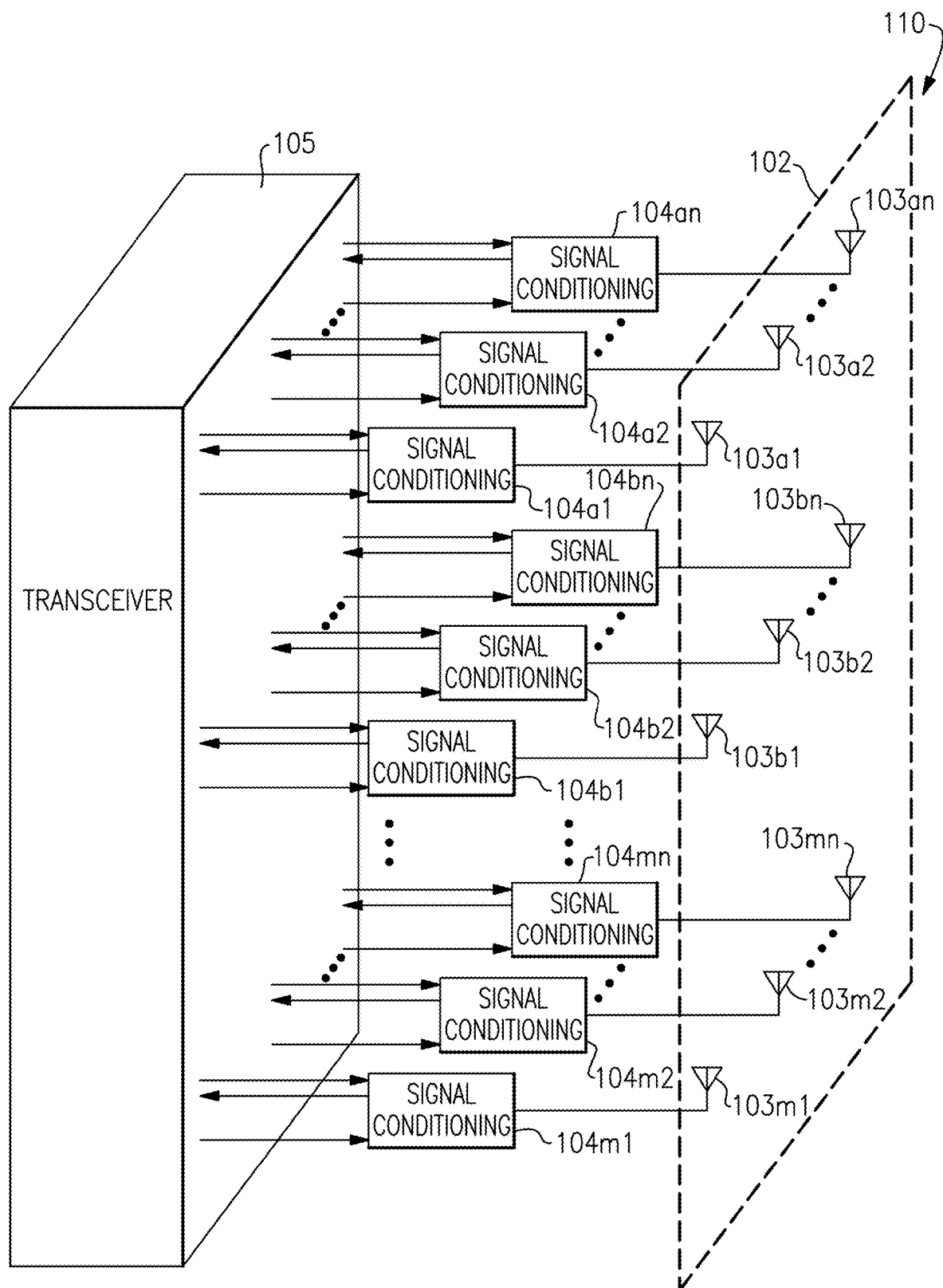
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits 104a1, 104a2 . . . 104an, 104b1, 104b2 . . . 104bn, 104 m1, 104m2 . . . 104mn, and an antenna array 102 that includes antenna elements 103a1, 103a2 . . . 103an, 103b1, 103b2 . . . 103bn, 103m1, 103m2 . . . 103mn.

Communications systems that communicate using millimeter wave carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
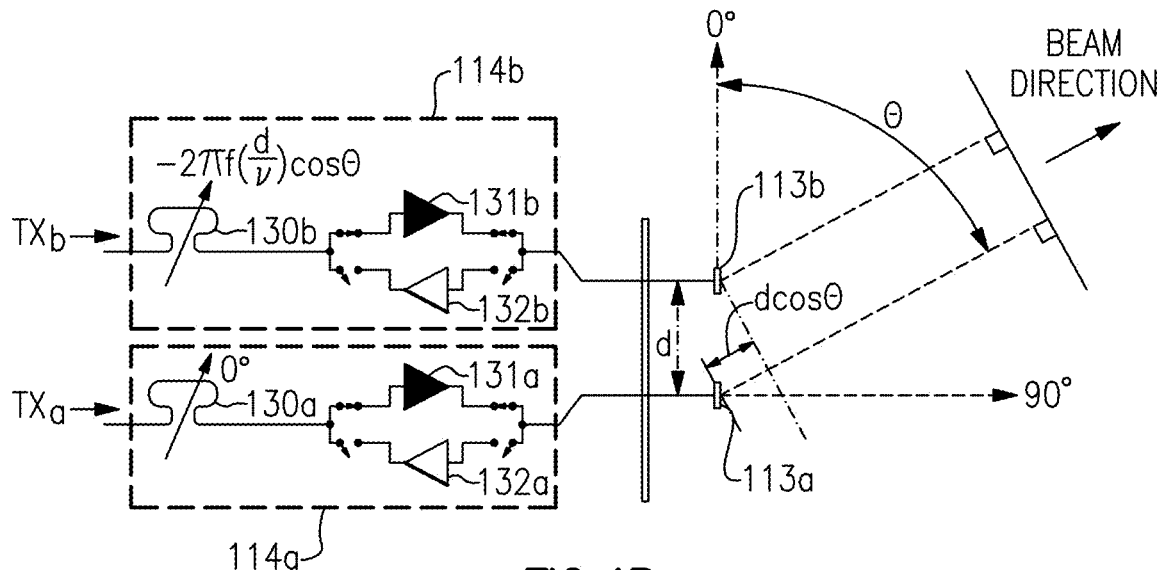
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 4B has been annotated with an angle θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle θ can be achieved. For example, when the first phase shifter 130a has a reference value of 0°, the second phase shifter 130b can be controlled to provide a phase shift of about $-2\pi f(d/v)\cos\theta$ radians, where f is the fundamental frequency of the transmit signal, d is the distance between the antenna elements, v is the velocity of the radiated wave, and x is the mathematic constant pi.

In certain implementations, the distance d is implemented to be about $\frac{1}{2}\lambda$, where $\lambda$ is the wavelength of the fundamental component of the transmit signal. In such implementations, the second phase shifter 130b can be controlled to provide a phase shift of about $-\pi\cos\theta$ radians to achieve a transmit beam angle θ.

Accordingly, the relative phase of the phase shifters 130a, 130b can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
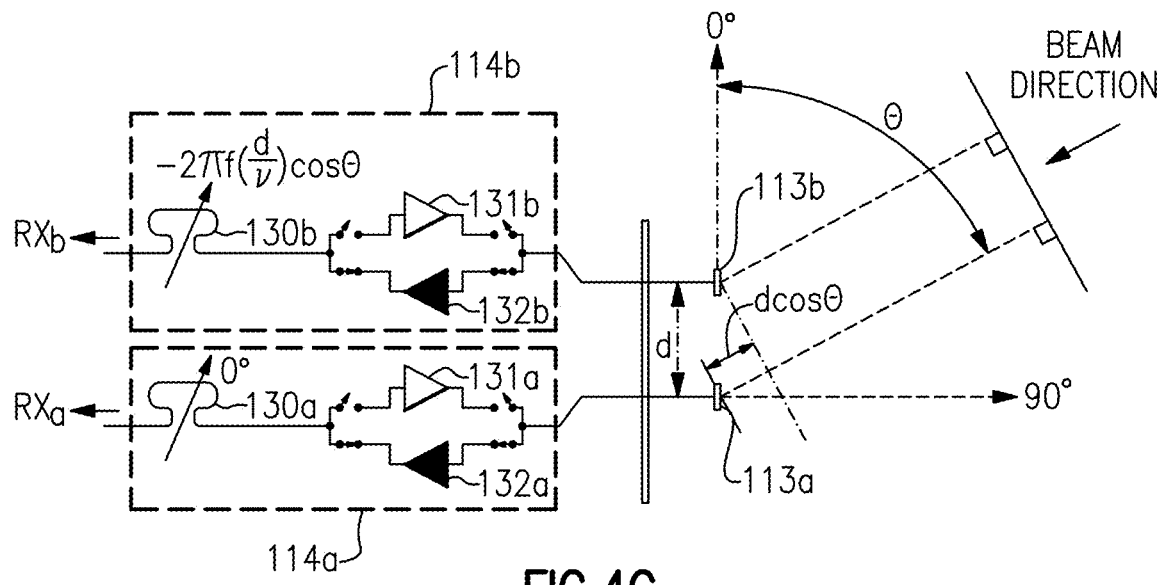
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130a and the second phase shifter 130b can be selected to about equal to $-2\pi f(d/v)\cos\theta$ radians to achieve a desired receive beam angle θ. In implementations in which the distance d corresponds to about $\frac{1}{2}\lambda$, the phase difference can be selected to about equal to $-\pi\cos\theta$ radians to achieve a receive beam angle θ.

Although various equations for phase values to provide beamforming have been provided, other phase selection values are possible, such as phase values selected based on implementation of an antenna array, implementation of signal conditioning circuits, and/or a radio environment.

Examples of EVM Exclusion Period for Establishing Compliance with a Transient Period Shorter transient period (tp) capability is one feature for 5G NR user equipment (UE) currently supported for frequency bands in 5G FR1. The capability is declared by the UE to a base station (BTS) for each supported FR1 frequency band. For instance, a UE can declare a capability of 2 µs tp, 4 µs tp, or 7 µs tp, with a default 10 µs tp capability applying when the UE does not signal any tp capability.

For networks configured at sub-carrier-spacing (SCS) of 60 kHz, a shorter transient period capability may help the BTS avoid scheduling the UE with the symbol blanking specified in 3GPP TS 38.101-1, and hence may enhance uplink throughput and/or latency for Physical Uplink Shared Channels (PUSCH).

Moreover, for sounding reference signaling (SRS) ON/OFF time-masks, a UE with shorter transient period capability may help avoid symbol blanking and hence help the BTS perform channel sounding at a faster rate than a UE that does not support faster transient period capability. Faster channel sounding in turn can enhance spectrum efficiency and/or improve throughput performance.

Accordingly, short transient period capability can provide significant system performance improvements for SCS 60 kHz as well as other SCS values. For SRS antenna switching, the shorter tp capability may avoid symbol blanking at all permitted SCS values (for instance 15 kHz, 30 kHz, and 60 kHz).

Figure 5A:
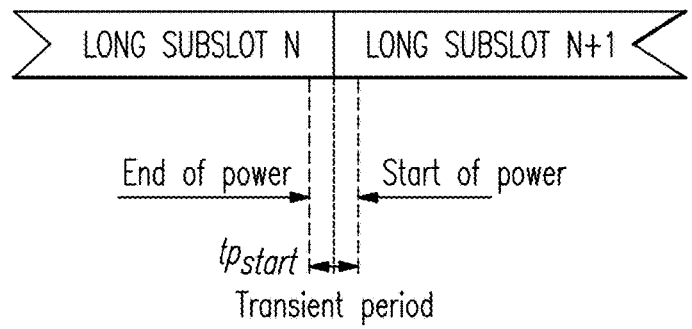
FIG. 5A is a schematic diagram of one example of a transmit symbol sequence including a transient period for accommodating a power transient.

FIG. 5A is a schematic diagram of one example of a transmit symbol sequence including a transient period for accommodating a power transient. The transient period (tp) separates symbol transmissions (for instance, between a long subslot N and a long subslot N+1 transmission time mask) associated with a power transient. For example, a high output power level transient is triggered by requesting the UE to perform a sudden uplink (UL) resource block (RB) allocation change, for instance, from 1 RB to 20 RB which triggers a 13 dB power step at the UE transmit antenna.

Figure 5B:
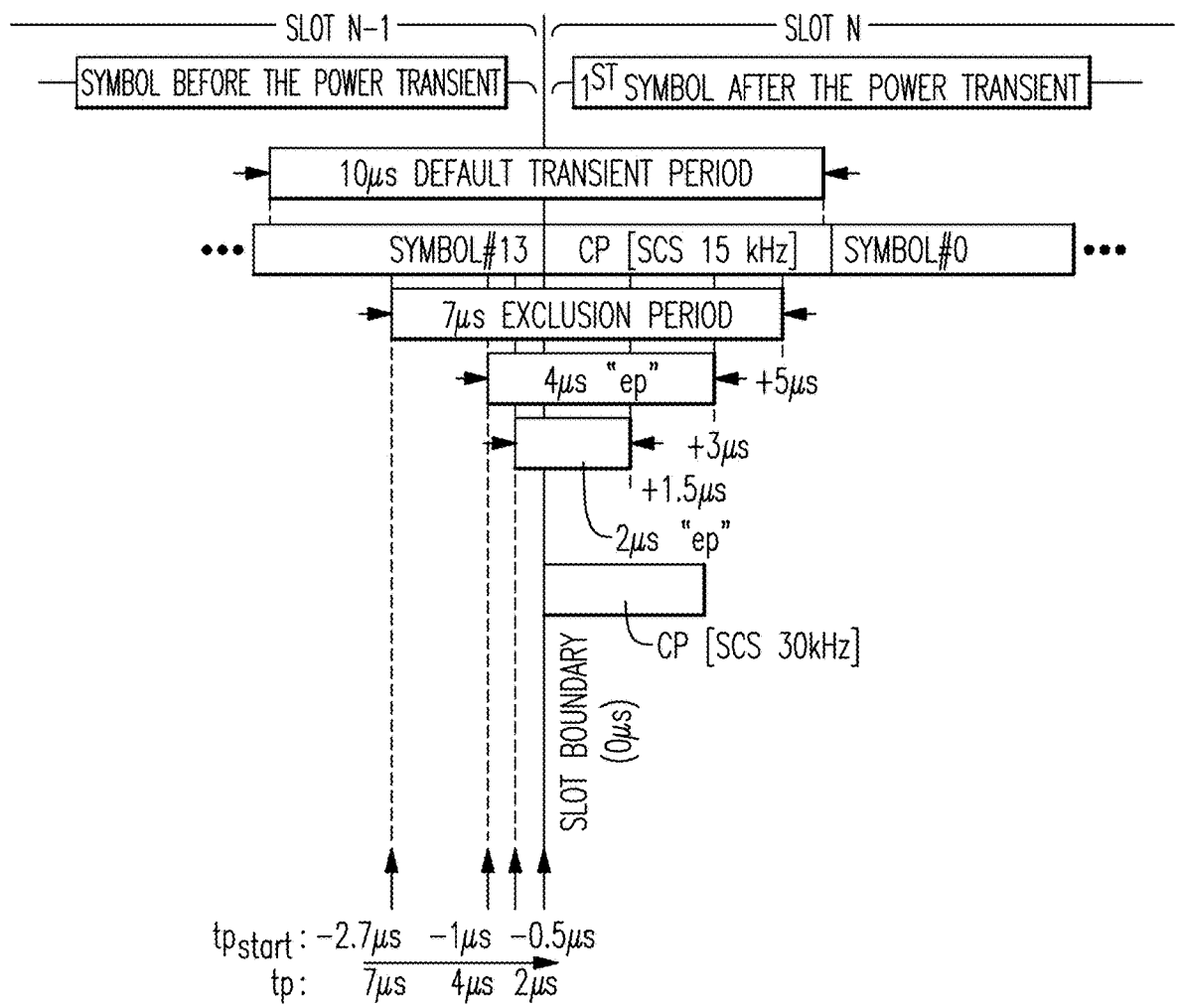
FIG. 5B is a schematic diagram of another example of a transmit symbol sequence including a transient period for accommodating a power transient.

FIG. 5B is a schematic diagram of another example of a transmit symbol sequence including a transient period for accommodating a power transient. The transmit symbol sequence depicts a first symbol (symbol #13) and a second symbol (symbol #0) for a scenario of SCS 15 kHz with annotations shown for various declared tp capabilities.

For UE conformance testing, metric error vector magnitude (EVM) testing can be used to verify that the UE meets a declared transient period.

Conformance is performed using an ON-to-ON time-mask, such as that shown in FIG. 5B. To verify that the UE transient response meets a declared transient period capability, conformance testing can be performed by creating an EVM measurement exclusion period (ep) which duration matches the declared transient period capability. A measurement exclusion period is a time window over which the test equipment (for example, an EVM analyzer) does not factor in and/or measure EVM.

Thus, EVM is measured before and after the EVM exclusion period such that when the UE exceeds a declared transient period capability any residual transient will appear as degraded EVM performance.

For each transient period capability, a starting transient period ($tp_{start}$) indicates the time at which the EVM exclusion period starts relative to slot/sub-slot boundaries of a symbol sequence. Additionally, the EVM exclusion period ends at $tp_{start}$+tp. For example, for a UE that declares a tp=2 µs capability, $tp_{start}$=−0.5 µs relative to slot/sub-slot boundaries, and thus the EVM exclusion period starts at −0.5 µs and ends at +1.5 µs relative to the slot/sub-slot boundaries.

FIG. 5C depicts one example of testing scenarios for various transient period and SCS values.

The 3GPP TS 38.101-1 standard assumes that UE transient period capability is not dependent on SCS and is solely frequency band dependent. Thus, the 3GPP TS 38.101-1 standard verifies FR1 transient period capability at 15 kHz for tp=7 µs capability, at 15 kHz for tp=4 µs capability, and at SCS 30 kHz for tp=2 µs capability, with the exception that UE that does not support SCS 30 kHz for tp=2 µs capability is tested for conformance at SCS 15 kHz. Such scenarios are depicted by diagonally forward slashed check boxes in FIG. 5C.

However, when symbol blanking is removed at SCS 60 kHz for UEs that support shorter transient period capability, 3GPP TS 38.101-1 does not provide a mechanism for verifying UE compliance with the transient period capability.

For operation in FR1 bands, the shorter transient period capability may bring significant benefits at SCS 60 kHz in scenarios in which symbol blanking in the ON/OFF time mask is not used, in particular for UEs reporting 2 µs short transient capability.

In FR1, the EVM exclusion period is created using two EVM measurements, including a fast Fourier transform (FFT) in the symbol located prior to the slot boundary and in the first symbol that follows the slot boundary at which the transient occurs.

Figures 1, 5D:
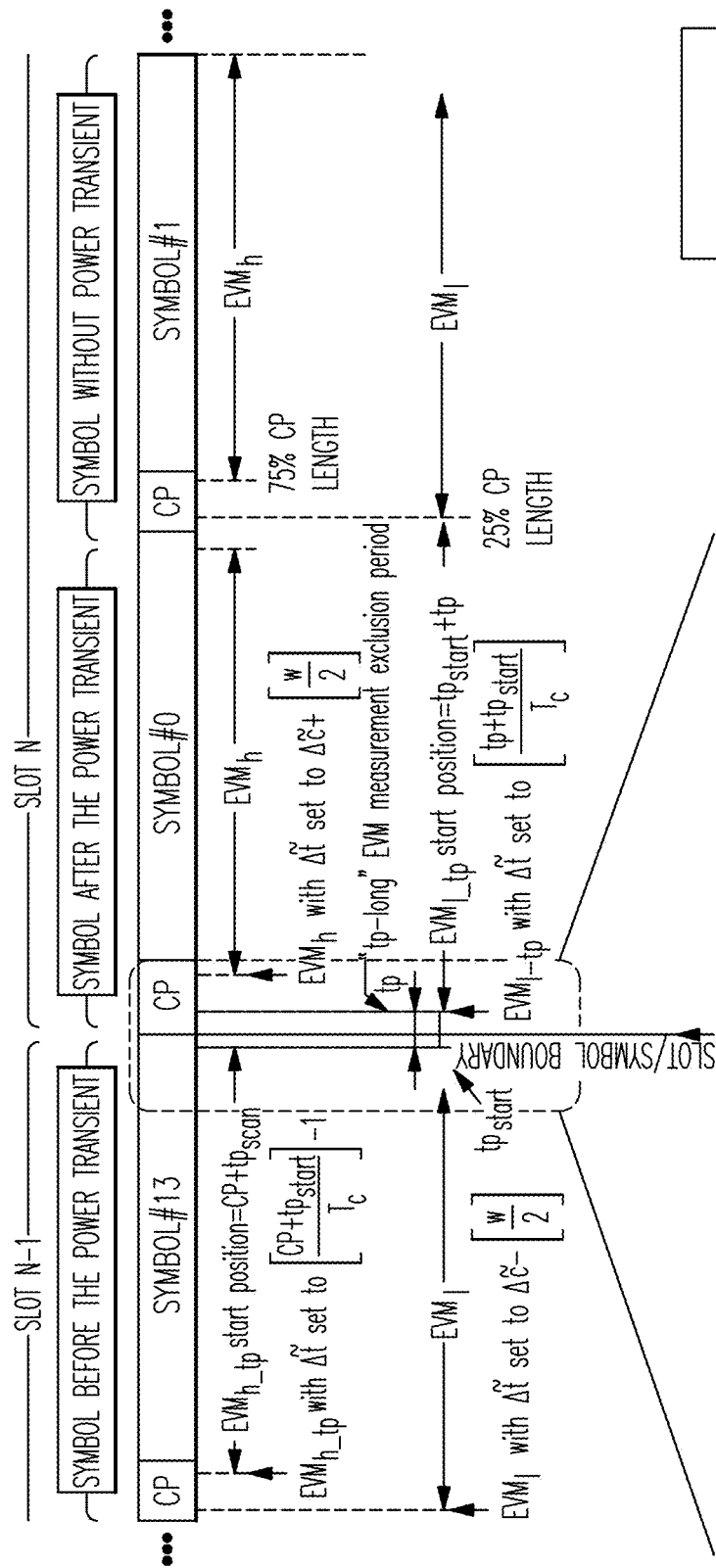
FIG. 5D (which has been partitioned across figure sheets as FIG. 5D-1 and FIG. 5D-2) is a schematic diagram of a first example of error vector magnitude (EVM) measurements for a transmit symbol sequence including a transient period for accommodating a power transient.

The two-FFTs used in the symbol prior the slot boundary provide the measured values of $\overline{EVM_l}$ and $\overline{EVM_{h\_tp}}$, while the two-FFTs used in the first symbol after the slot boundary provide the measured values of $\overline{EVM_h}$ and $\overline{EVM_{l\_tp}}$, $\overline{EVM_l}$, $\overline{EVM_{h\_tp}}$, $\overline{EVM_h}$ and $\overline{EVM_{l\_tp}}$ are graphically depicted in FIG. 5D.

For operation in the FR2 frequency bands, the same issues as in FR1 occur (for instance, due to symbol blanking in an ON-to-ON time mask). The need for shorter transient period capable UEs may even be more desirable as mini-slot (short sub-slots) are more likely to be deployed at millimeter wave (mmw) frequency bands than at FR1 frequency bands. Short sub-slots/mini slots are slots that contain less than the 14 symbols and contain only 2 symbols per slot. Thus, it is particularly desirable in this scenario that the integrity of each symbol is guaranteed.

Since the shorter transient period capability is a per band capability, UEs that declare, for instance, tp=2 µs capability in an FR1 band may be deployed on networks configured with SCS 60 kHz. When symbol blanking is removed from the TS 38.101-1 for FR1 or TS 38.101-2 for FR2, stakeholders (for instance, UE manufacturers and/or telecom operators) may request that the UE performance on such networks is verified.

Provided herein are apparatus and methods for EVM testing for verifying UE compliance with a transient period capability. The teachings herein can provide conformance testing for various SCS values, transient periods, and frequency bands.

For instance, in one example, compliance verification at FR1 for tp=2 µs and SCS 60 kHz (depicted by a diagonally back slashed check box in FIG. 5C) is achieved using the UE compliance verification schemes herein.

Moreover, certain transient period SCS scenarios (for instance, as depicted by blank boxes marked with an "X" in FIG. 5C) indicate conformance test cases in which the EVM measurement exclusion period cannot match the declared tp capability because the $FFT_{l\_tp}$ exceeds the cyclic prefix (CP) length.

To address this issue, UE capability can be verified even though the EVM exclusion period cannot be created by shortening the EVM exclusion period relative to the transient period and allowing EVM relaxation. Thus, in the context of FR1, such a technique allows verification of scenarios such as tp=4 µs/SCS 30 kHz, and tp=2 µs/SCS 60 KHz.

Furthermore, with respect to FR2, the aforementioned techniques can be used to provide UE conformance testing. Such FR2 scenarios can include, for example, SCS 60 kHz for tp=2 µs and tp=1 µs, SCS 120 kHz for tp=1 µs and tp=500 ns, SCS 480 kHz for tp=500 ns and tp=250 ns, and/or SCS 960 kHz for tp=500 ns and tp=125 ns.

3GPP has not defined any technique or requirement for shorter transient period capability at FR2 and/or the FR2 non-terrestrial network (FR2-NTN). Thus, the techniques above provide FR and FR-NTN conformance testing for 5G. Moreover, it can be anticipated that in 6G, hyper reliable low latency (HRLLC) features will utilize mini slot scheduling (for instance, 2 symbol long) in new frequency ranges (such as 7-24 GHz and beyond 71 GHz) where shorter transient period capability may play a key role.

Figures 2, 5D:
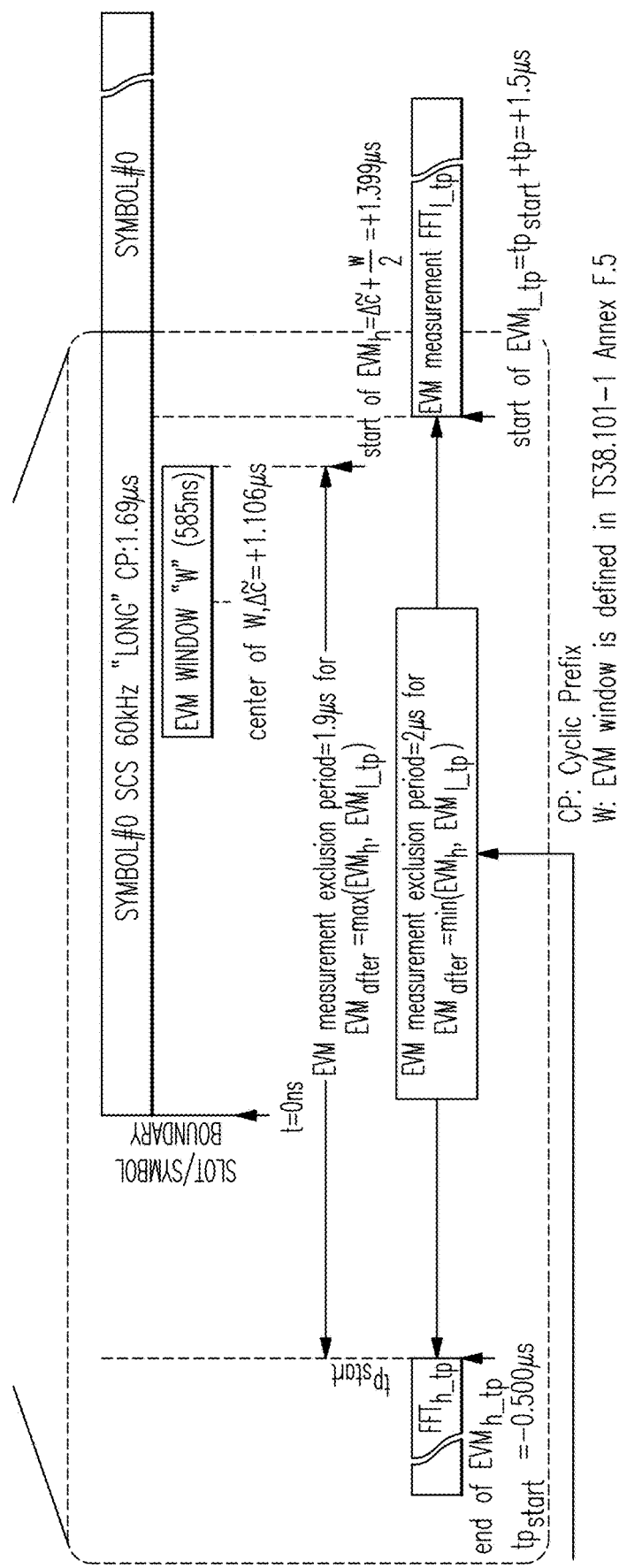

FIG. 5D is a schematic diagram of a first example of EVM measurements for a transmit symbol sequence including a transient period for accommodating a power transient. Due to the drawing size, FIG. 5D has been partitioned across figure sheets as FIG. 5D-1 and FIG. 5D-2, which are collectively referred to herein as FIG. 5D.

FIG. 5E is a table (Table 1) of EVM definition for the first example of starting power transient and SCS values.

To verify a UE that declares a tp=2 µs capability in an FR1 band at SCS 60 kHz, an EVM measurement exclusion period of 2 µs duration is created by adopting the EVM equations of Table 1. In Table 1, EVM definition for UE reporting 2 µs transient period and verification of impact on SCS 60 kHz networks in FR1 frequency bands is depicted.

As shown in FIGS. 5D and 5E, the adoption of $EVM_{after}=\min(\overline{EVM_{l\_tp}},\overline{EVM_h})$ creates a 2 µs long EVM exclusion period at SCS 60 KHz.

Figure 5F:
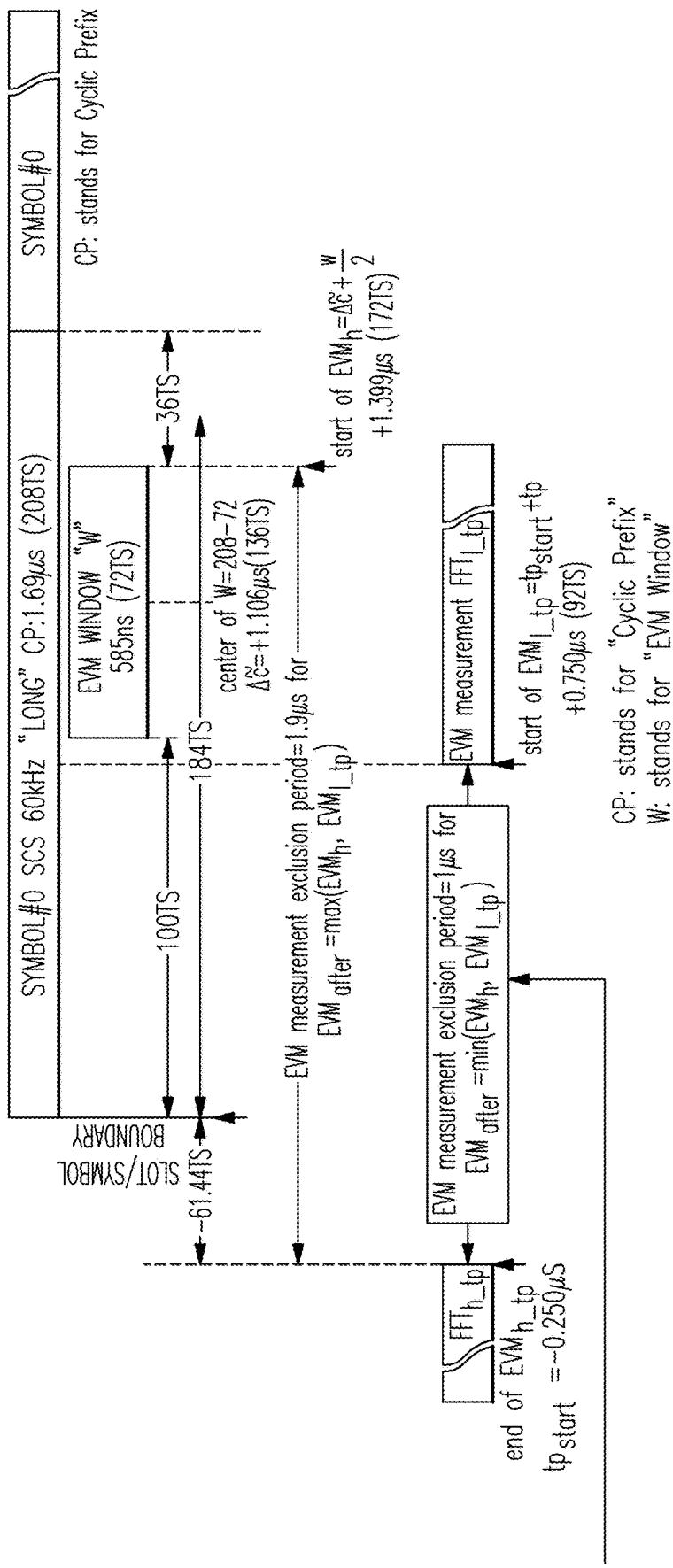
FIG. 5F is a schematic diagram of a second example of EVM measurements for a transmit symbol sequence including a transient period for accommodating a power transient.

FIG. 5F is a schematic diagram of a second example of EVM measurements for a transmit symbol sequence including a transient period for accommodating a power transient.

FIG. 5G is a table (Table 2) of EVM definition for the second example of starting power transient and SCS values.

With reference to FIGS. 5F and 5G, a mechanism for compliance testing for tp=1 µs at SCS 60 kHz in FR2 is provided. In this example, $tp_{start}=-0.5$ µs, and the FFT equations below are applied to $\overline{EVM_l}$, $\overline{EVM_{h\_tp}}$, $\overline{EVM_h}$, and $\overline{EVM_{l\_tp}}$:

$EVM_{h\_tp}$ with $\Delta\tilde{t}$ set to $$\left\lfloor \frac{CP + tp_{start}}{T_c} \right\rfloor - 1,$$

$EVM_{l\_tp}$ with $\Delta\tilde{t}$ set to $$\left\lfloor \frac{tp + tp_{start}}{T_c} \right\rfloor + 1,$$

$EVM_h$ with $\Delta\tilde{t}$ set to $$\Delta\tilde{t} + \left\lfloor \frac{W}{2} \right\rfloor,$$

and
$EVM_l$ with $\Delta\tilde{t}$ set to $$\Delta\tilde{t} + \alpha - \left\lfloor \frac{W}{2} \right\rfloor,$$

With continuing reference to FIGS. 5F and 5G, an EVM measurement exclusion period of 1 µs duration can be created by adopting the EVM equations of Table 2 and for any negative value of $tp_{start}$. For instance, here $tp_{start}$ is proposed as −250 ns by scaling from the FR1 $tp_{start}$ values for tp=2 µs and tp=4 µs.

Accordingly, the adoption of $EVM_{after}=\max(\overline{EVM_{l\_tp}},\overline{EVM_h})$ creates a 1 µs long EVM exclusion period at SCS 60 KHz.

Figure 5H:
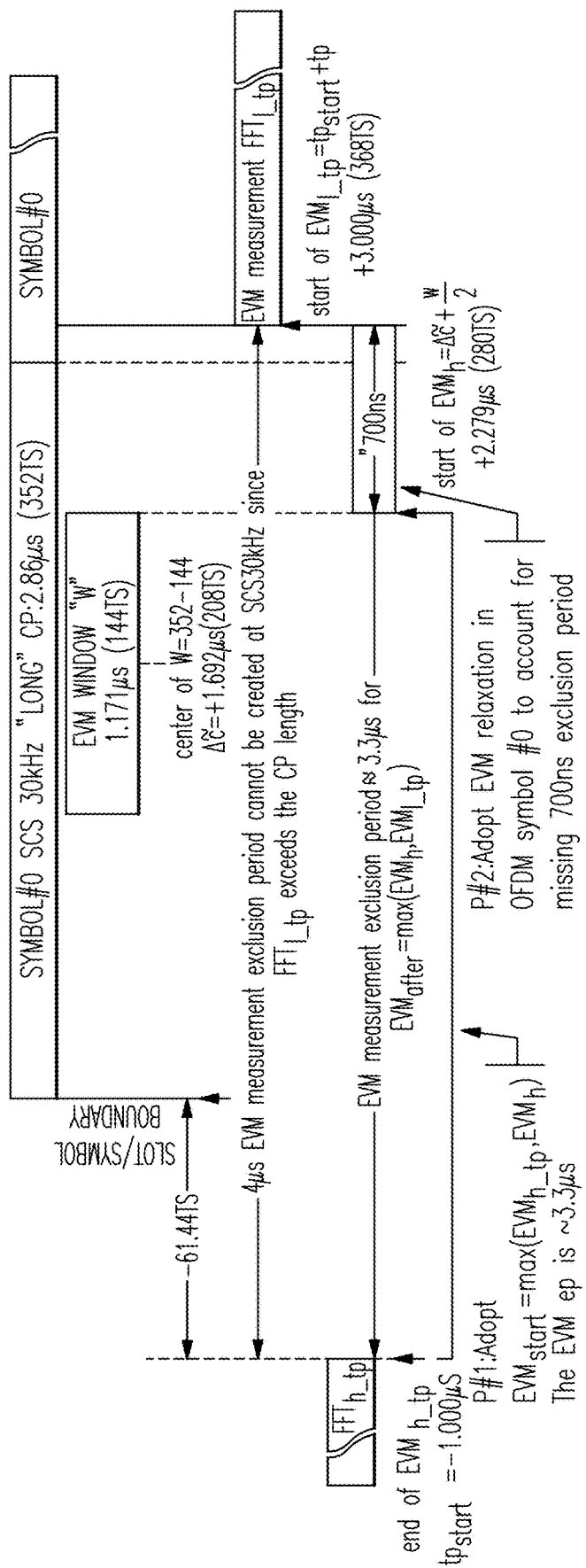
FIG. 5H is a schematic diagram of a third example of EVM measurements for a transmit symbol sequence including a transient period for accommodating a power transient.

FIG. 5H is a schematic diagram of a third example of error vector magnitude (EVM) measurements for a transmit symbol sequence including a transient period for accommodating a power transient.

FIG. 5I is a table (Table 3) of EVM definition for the third example of starting power transient and SCS values.

With reference to FIGS. 5H and 5I, the $FFT_l tp_{start}$ position exceeds 100% of the CP length, hence EVM cannot be measured using this FFT in OFDM symbol #0. Hence, the 4 µs long exclusion period cannot be created at SCS 30 kHz and the UE tp capability cannot be verified in this manner.

To verify at SCS 30 kHz a UE that declares a tp=4 µs capability in an FR1 band, a shorted EVM measurement exclusion period of 3.3 µs duration can be used, along with an adopting of the EVM equations of Table 3 and an allowed EVM relaxation percentage (for instance, 10% and 7% for 256QAM and 64QAM, respectively, or other suitable values) for the first symbol that follows.

Accordingly, UE capability can nevertheless be verified by shortening the EVM exclusion period relative to the transient period and allowing EVM relaxation.

Tables A, B, C, D, and E below relate to example parameters for EVM measurements for transient period capability in FR2.

Table A is an example of EVM window length "W" for normal CP for SCS 60 KHz.

TABLE A

| Channel Bandwidth (MHz) | FFT Size | Cyclic Prefix Length in FFT Cycles | EVM Window Length W | Ratio of W to Total CP Length |
|---|---|---|---|---|
| 50 | 1024 | 72 | 36 | 50 |
| 100 | 2048 | 144 | 72 | 50 |
| 200 | 4096 | 288 | 144 | 50 |

Table B is an example of EVM window length "W" for normal CP for SCS 120 KHz.

TABLE B

| Channel Bandwidth (MHz) | FFT Size | Cyclic Prefix Length in FFT Cycles | EVM Window Length W | Ratio of W to Total CP Length |
|---|---|---|---|---|
| 50 | 512 | 36 | 18 | 50 |
| 100 | 1024 | 72 | 36 | 50 |
| 200 | 2048 | 144 | 72 | 50 |
| 400 | 4096 | 288 | 144 | 50 |

Table C is an example of tp and $tp_{start}$ values for various FR2 bands.

TABLE C

| tp [µs] | $tp_{start}$ [µs] |
|---|---|
| 2 | −0.5 |
| 1 | −0.25 |

TABLE C-continued

| tp [μs] | tp$_{start}$ [μs] |
|---|---|
| 0.5 | −0.125 |
| 0.25 | −0.0625 |
| 0.125 | −0.03125 |
| 0.0625 | −0.015625 |

Table D is an example of EVM window length "W" for normal CP for SCS 480 KHz.

TABLE D

| Channel Bandwidth (MHz) | FFT Size | Cyclic Prefix Length in FFT Cycles | EVM Window Length W | Ratio of W to Total CP Length |
|---|---|---|---|---|
| 400 | 1024 | 72 | 36 | 50 |
| 800 | 2048 | 144 | 72 | 50 |
| 1600 | 4096 | 288 | 144 | 50 |

Table E is an example of EVM window length "W" for normal CP for SCS 960 KHz.

TABLE E

| Channel Bandwidth (MHz) | FFT Size | Cyclic Prefix Length in FFT Cycles | EVM Window Length W | Ratio of W to Total CP Length |
|---|---|---|---|---|
| 400 | 512 | 36 | 18 | 50 |
| 800 | 1024 | 72 | 36 | 50 |
| 1600 | 2048 | 144 | 72 | 50 |
| 2000 | 2048 | 144 | 72 | 50 |

3GPP TS38.101-2 defines EVM window length "W" for SCS 60 kHz (Table A) and SCS 120 kHz (Table B), but does provide EVM windows for SCS 240, 480 and 960 KHz.

The tables of above provide example values for parameters for EVM measurements for FR2. For example, if the UE signals a transient period (tp) of 0.0625, 0.125, 0.25, 0.5, 1 or 2 μs, the transient period start position is given by tp$_{start}$ in Table C.

Moreover, Table D specifies EVM window 'W' length for normal CP for 480 kHz SCS, while Table E specifies EVM window 'W' length for normal CP for 960 kHz SCS.

In certain implementations for FFT timing, an EVM analyzer calculates EVM$_l$ with $\tilde{\Delta t}$ set to $$\Delta \tilde{c} + \alpha - \left\lfloor \frac{W}{2} \right\rfloor,$$

calculates EVM$_h$ with $\tilde{\Delta t}$ set to $$\Delta \tilde{c} + \left\lfloor \frac{W}{2} \right\rfloor,$$

calculates EVM$_{l\_tp}$ with $\tilde{\Delta t}$ set to $$\left\lfloor \frac{tp + tp_{start}}{T_c} \right\rfloor + 1,$$

and calculates EVM$_{h\_tp}$ with $\tilde{\Delta t}$ set to $$\left\lfloor \frac{CP + tp_{start}}{T_c} \right\rfloor - 1,$$

where CP is the cyclic prefix. In certain implementations, CP is defined in TS 38.211.

Figure 5J:
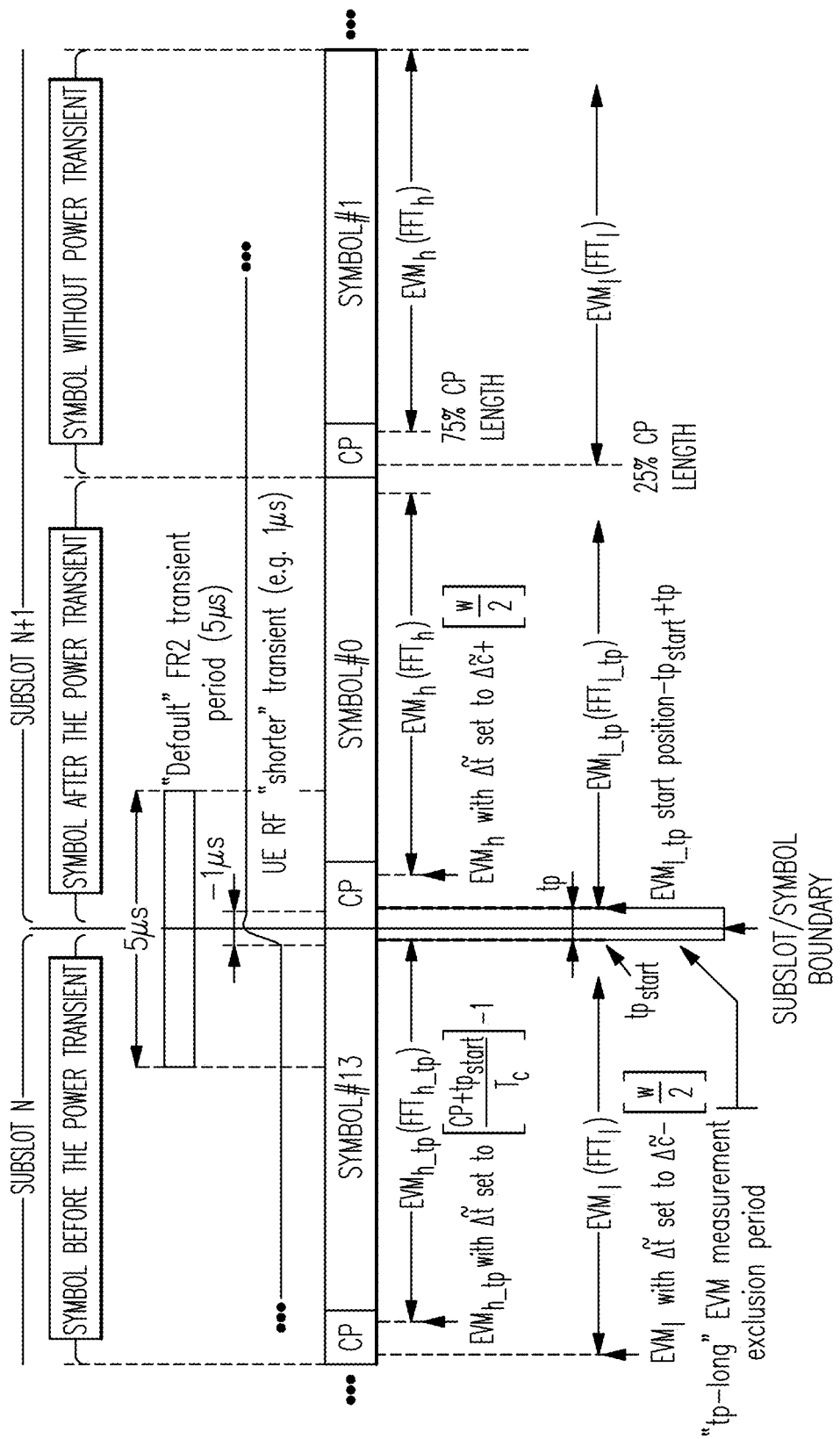
FIG. 5J is a schematic diagram of one embodiment of FR2 EVM measurement FFT timings for verifying transient period capability.

FIG. 5J is a schematic diagram of one embodiment of FR2 EVM measurement FFT timings for verifying transient period capability.

In this example, an asymmetrical EVM exclusion period across symbol boundaries is used. Additionally, a set of measurement EVM FFT window start positions (and parameter tp$_{start}$) are specified for each SCS and declared UE shorter transient period capability.

With continuing reference to FIG. 5J, the UE can signal the shorter transient period (tp) of 0.125 μs, 0.25 μs, 0.5 μs, 1 μs or 2 μs, with corresponding transient period start position given by tp$_{start}$ in Table C above. Such a technique can apply to UEs operating in both the FR2 frequency range as well as the FR2 non-terrestrial network (FR2-NTN) frequency range (for instance, as specified in TS38.101-5).

In accordance with the illustrated embodiment, an EVM analyzer can calculate four FFTs to verify compliance with a transient period capability.

For example, the EVM analyzer can calculate a first FFT for EVM$_l$ with $\tilde{\Delta t}$ set to $$\Delta \tilde{c} + \alpha - \left\lfloor \frac{W}{2} \right\rfloor.$$

Additionally, the EVM analyzer can calculate a second FFT for EVM$_h$ with $\tilde{\Delta t}$ set to $$\Delta \tilde{c} + \left\lfloor \frac{W}{2} \right\rfloor.$$

Furthermore, the EVM analyzer can calculate a third FFT for EVM$_{l\_tp}$ with $\tilde{\Delta t}$ set to $$\left\lfloor \frac{tp + tp_{start}}{T_c} \right\rfloor + 1.$$

Additionally, the EVM analyzer can calculate a fourth FFT for EVM$_{h\_tp}$ with $\tilde{\Delta t}$ set to $$\left\lfloor \frac{CP + tp_{start}}{T_c} \right\rfloor - 1.$$

FIG. 5K is a table of one embodiment of EVM definitions for various examples of starting power transient and SCS values in FR2 frequency bands. The EVM definitions can be used in accordance with the technique of FIG. 5J.

With reference to FIGS. 5J and 5K, the illustrated technique allows for verifying the UE shorter transient period declaration under the constraint of asymmetrically shared EVM exclusion period.

The start timing of the FFT1_tp in the OFDM symbol #0 that follows the power transient is less than 0% of the normal CP length. This is not technically an issue since the CP length in this symbol is larger than the normal CP length used for the symbol preceding the power transient.

However, some base station and test equipment vendors may not support placing the EVM measurement FFTs at such low start timing positions. For example, the verification of tp=0.5 µs at SCS 480 kHz in the table of FIG. 5K places the FFTl_tp start position at ~−100% of the normal CP length.

Furthermore, the start timing of the FFTh_tp in the OFDM symbol #13 that precedes the power transient may lead to EVM degradation due to weighted overlap and add (WOLA) effects. However, WOLA may not necessarily be an issue since the amount time windowing filtering applied to the OFDM sub-carriers can be dynamically adjusted depending on the modulation order.

For example, the verification of tp-0.5 µs at SCS 480 kHz of table 8.5 places the FFTh_tp start position at ~15% of the normal CP length. If time windowing is set to 25% CP length, EVM degradation due to WOLA is expected.

Figure 5L:
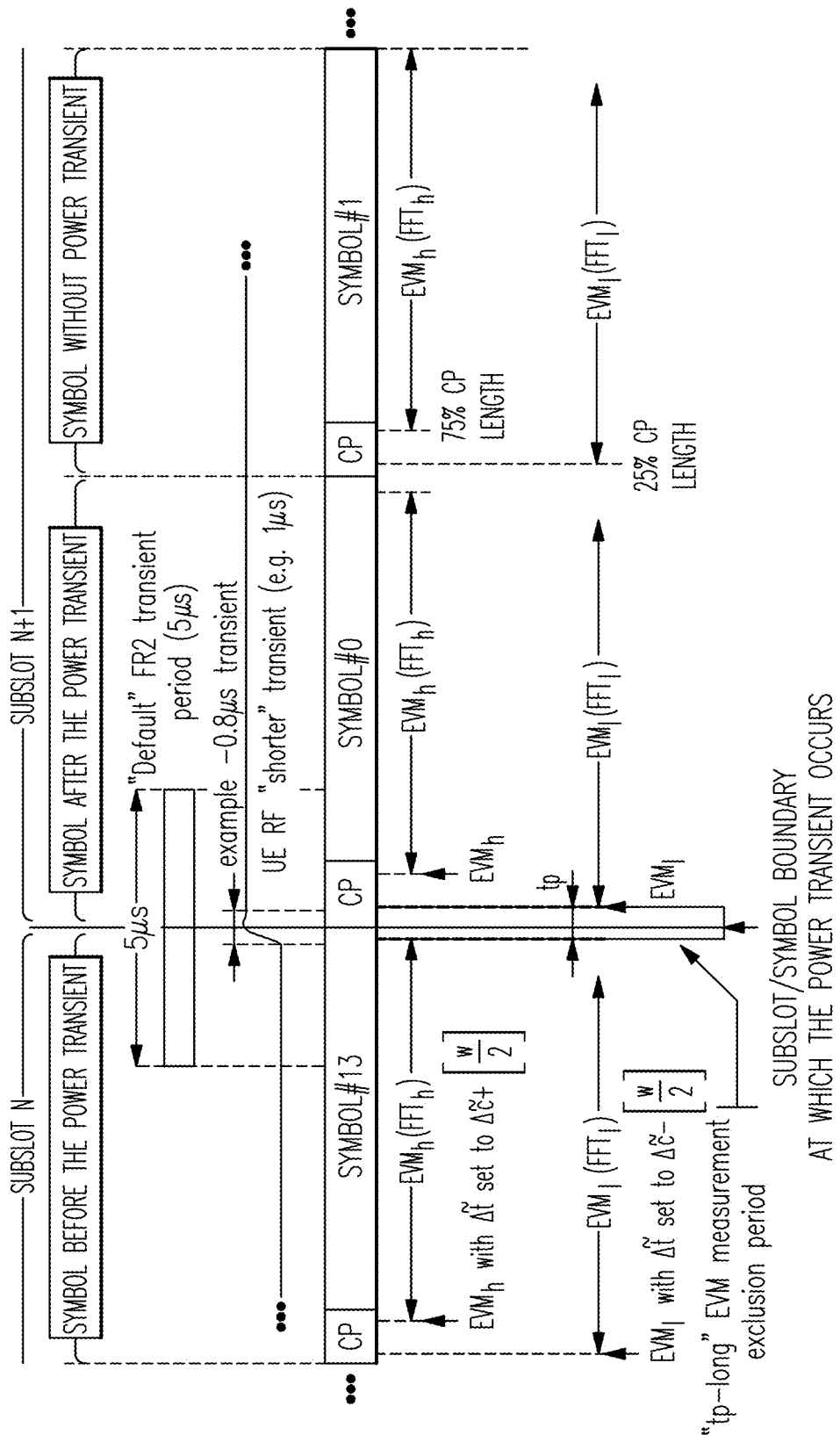
FIG. 5L is a schematic diagram of another embodiment of FR2 EVM measurement FFT timings for verifying transient period capability.

In view of the foregoing, there is a desire to create a symmetrically shared measurement EVM exclusion period. FIGS. 5L and 5M generally relate to such a technique, which advantageously avoids FFT start positions that may be unsupported by certain test equipment vendors.

FIG. 5L is a schematic diagram of another embodiment of FR2 EVM measurement FFT timings for verifying transient period capability.

In FR2, the radio channel delay spread may be smaller than in FR1 due to shorter propagation distance and/or near line-of-sight propagation conditions resulting from use of narrow beam width from the base station. Under these conditions, the EVM measurement exclusion period may no longer need to be asymmetrically shared across the symbol boundaries.

Rather, EVM exclusion periods that are symmetrically shared across the symbol boundaries can be created by reusing the static EVM FFTlow and FFThigh EVM measurement windows. Such a solution is simpler than that of FIG. 5J and does not require the test equipment to use custom FFT start position symbol per symbol. Furthermore, such a technique is likely to be more reflective of a FFT configuration for FR2 mmW base stations.

In accordance with the illustrated embodiment, an EVM analyzer can calculate two FFTs to verify compliance with a transient period capability.

For example, the EVM analyzer can calculate a first FFT for $EVM_l$ with $\Delta t$ set to $$\Delta \tilde{c} + \alpha - \left\lfloor \frac{W}{2} \right\rfloor.$$

Additionally, the EVM analyzer can calculate a second FFT for $EVM_h$ with $$\Delta \tilde{t} \text{ set to } \Delta \tilde{c} + \left\lfloor \frac{W}{2} \right\rfloor.$$

Table F is an example of SCS for conformance/EVM exclusion period for FR2 in accordance with this technique.

TABLE F

| SCS [kHz] | Exclusion Period [µs] |
|---|---|
| 60 | 1.69 |
| 120 | 0.81 |

TABLE F-continued

| SCS [kHz] | Exclusion Period [µs] |
|---|---|
| 480 | 0.59 |
| 960 | 0.56 |

This solution is de-facto supported by test equipment since it does not require custom measurement FFTs dedicated to transient period. Furthermore, the technique relies on only two measurement FFT windows to verify the UE EVM at maximum output power (for instance, when no power transient occurs).

FIG. 5M is a table of another embodiment of EVM definitions for various examples of starting power transient and SCS values in FR2 frequency bands. The EVM definitions can be used in accordance with the technique of FIG. 5L.

Figure 6:
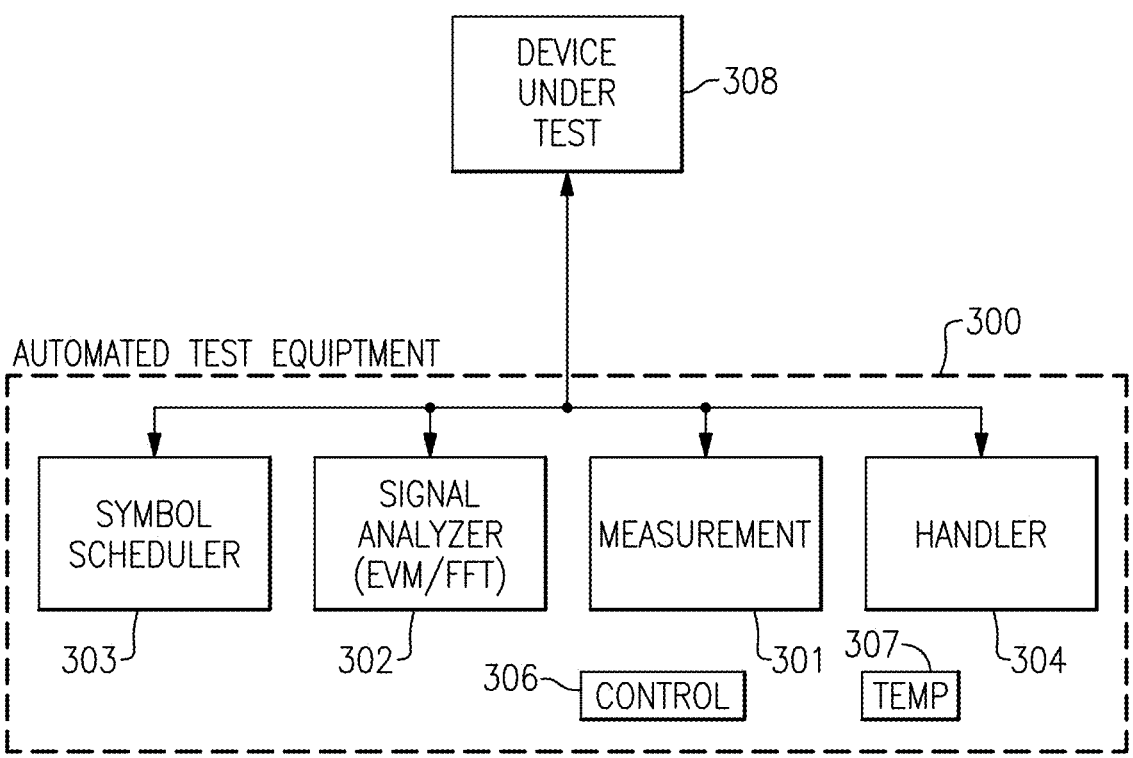
FIG. 6 is a schematic diagram of one embodiment of test equipment for testing compliance of fifth generation (5G) cellular user equipment (UE) with a transient period specification.

FIG. 6 is a schematic diagram of one embodiment of test equipment for testing compliance of 5G cellular UE with a transient period specification.

The test equipment 300 includes measurement device(s) 301 (for instance, antenna(s), probe(s), and/or other structures for EVM measurement), a signal analyzer 302, a symbol scheduler 303, a handler 304, a controller 306, and a temperature unit or controller 307. The test equipment 300 is used to rapidly test devices under test, such as 5G FR1 UE and/or 5G FR2 UE. The test equipment 300 is also referred to herein as an automated electronic testing system or automated test equipment (ATE).

Although FIG. 6 illustrates test equipment in accordance with one embodiment, the teachings herein are applicable to test equipment implemented in a wide variety of ways.

The test equipment 300 improves manufacturing throughput and/or provides rapid testing for emissions compliance of devices under test after manufacturing or partial manufacturing.

The test equipment 300 can be used to test the wireless emissions performance of the device under test 308 (for example, a mobile device or UE) to ensure that the device under test 308 operates within predefined performance specifications and parameters. The test equipment 300 uses automation to quickly perform measurements on devices under test (such as the device under test 308) and to evaluate the test results. The test equipment 300 can be used to speed-up testing time, to improve or identify issues with a manufacturing assembly line, and/or to reduce a number of defective devices reaching customers and/or end-users.

The measurement device(s) 301 operate to receive RF signals wirelessly transmitted from the device under test 308. For example, the test equipment 300 can use the measurement device(s) 301 to sense electromagnetic emissions from an antenna of the device under test 308 corresponding to transmitted symbols. The measurement device(s) 301 can include one or more probes and/or one or more antennas of a wide variety of types, including, but not limited to, wire probes, travelling wave antennas, reflector antennas, microstrip antennas, aperture antennas, and/or any other suitable type of measurement device. In certain implementations, the measurement device(s) 301 include one or more antenna arrays.

The signal analyzer 302 can be used to analyze RF signals received from the device under test 308 via the measurement device(s) 301. For example, the signal analyzer 302 can be used to process the received RF signals to detect a wide variety of RF signal characteristics, including, but not limited to, spectral content that can be analyzed for EVM using FFTs.

The handler 304 can be used to physically move or position the device under test 308, including, for example, moving the device under test 308 onto or off of a test platform.

In certain implementations, the handler 304 can include a mechanical arm to help move the device under test 308 and a plunger for holding the device under test 308 to the handler 304 using vacuum suction. However, other implementations of the handler 304 can be used, including, for example, implementations in which handler 304 secures the device under test 308 in other ways.

The handler 304 aids in positioning the device under test 308 at a desired location and/or orientation relative to components of the test equipment 300. For example, the handler 304 can be used to place the device under test 308 at a desired location relative to the measurement device(s) 301, thereby allowing the measurement device(s) to receive RF waves radiated from the device under test 308 at a particular direction and/or distance.

Although the handler 304 can be used to position the device under test 308 relative to the test equipment 300, additionally and/or alternatively the test equipment 300 can include moveable and/or rotatable parts for controlling the location of components of the test equipment 300 relative to the device under test 308. In one example, the measurement device(s) 301 are included in or on a moveable component.

The symbol scheduler 303 is used to instruct and/or control transmission of transmit symbols through a transmit chain of the device under test 308. For example, the symbol scheduler 303 can instruct and/or control the number of transmitted symbols in a symbol sequence, the RBs allocated to each symbol in the sequence, and/or other parameters of the symbol sequence transmitted by the device under test 308.

The temperature unit 307 can be used to control and/or monitor temperature of the test equipment 300 and/or device under test 308, thereby providing a controlled testing environment and/or allowing measurements to be tracked versus temperature. In certain implementations, the test equipment 300 performs EVM testing at two or more different temperatures.

The controller 306 can used to synchronize and/or to provide various control functionalities associated with the components of the test equipment 300, such as the measurement device(s) 301, the signal analyzer 302, the symbol scheduler 303, the handler 304, and/or the temperature unit 307.

In certain implementations, the test equipment 300 includes a computer processing unit, field programmable gate array, microcontroller, and/or other suitable electronic hardware suitable for processing data and controlling operations of the test equipment 300. In certain implementations, such hardware runs in part based on executing software. Moreover, common hardware and/or software can be used to implement certain components shown in FIG. 6 (for example, the signal analyzer 302, the symbol scheduler 303, and/or the controller 306).

Although the test equipment 300 has been illustrated and described as including certain components for clarity, the test equipment 300 can be modified or adapted in other ways. For example, the test equipment 300 can further include additional components, such as power supplies, sensors, digital signal processing instruments, and/or cables and interconnect.

Figure 7:
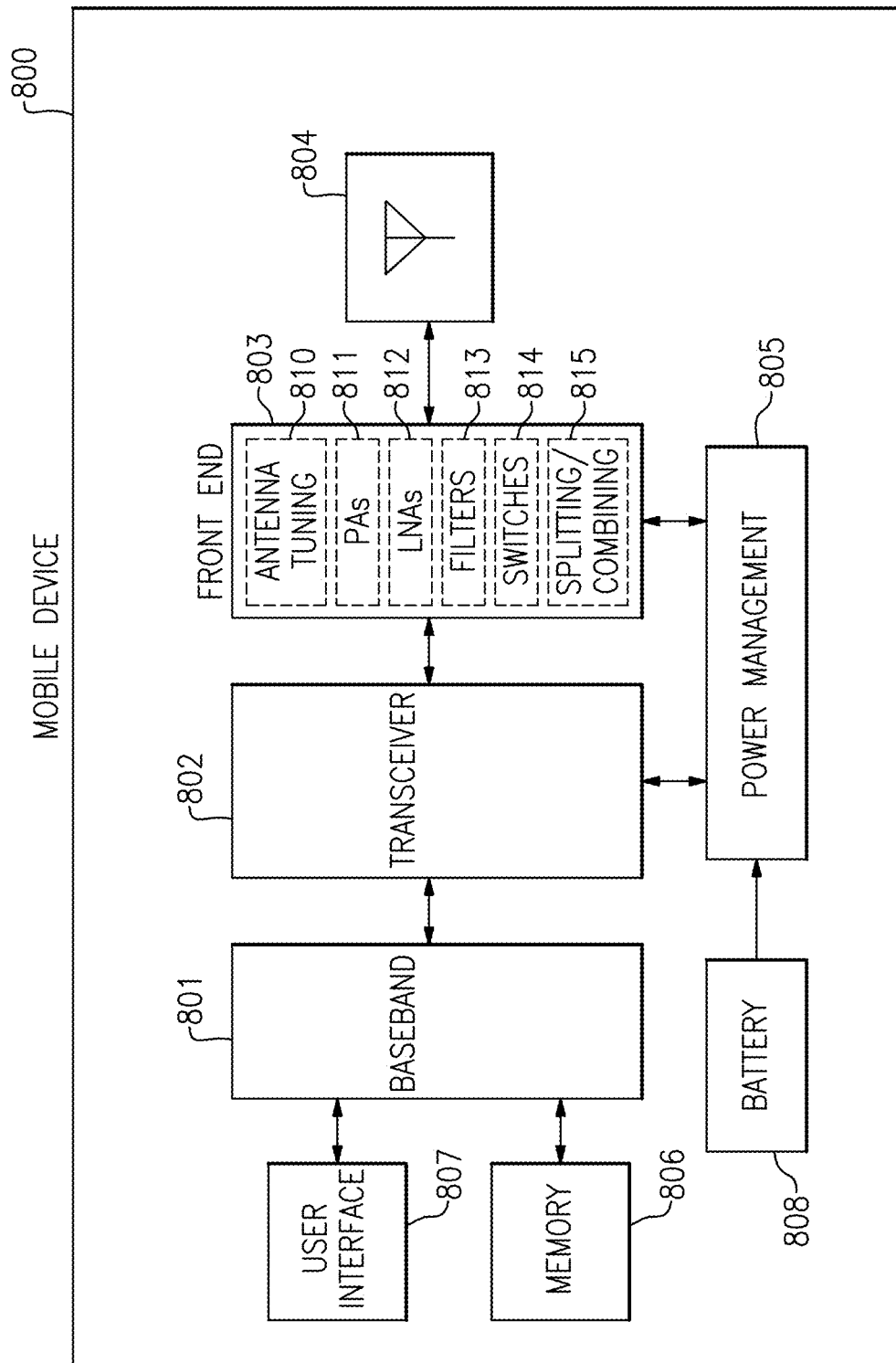
FIG. 7 is a schematic diagram of one embodiment of a mobile device.

FIG. 7 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR including 5G Advanced, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 7 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAS) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 7, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 7, the power management system 805 receives a battery voltage from the battery 808. The battery 808 can be any suitable battery for use in the mobile device 800, including, for example, a lithium-ion battery.

Figure 8:
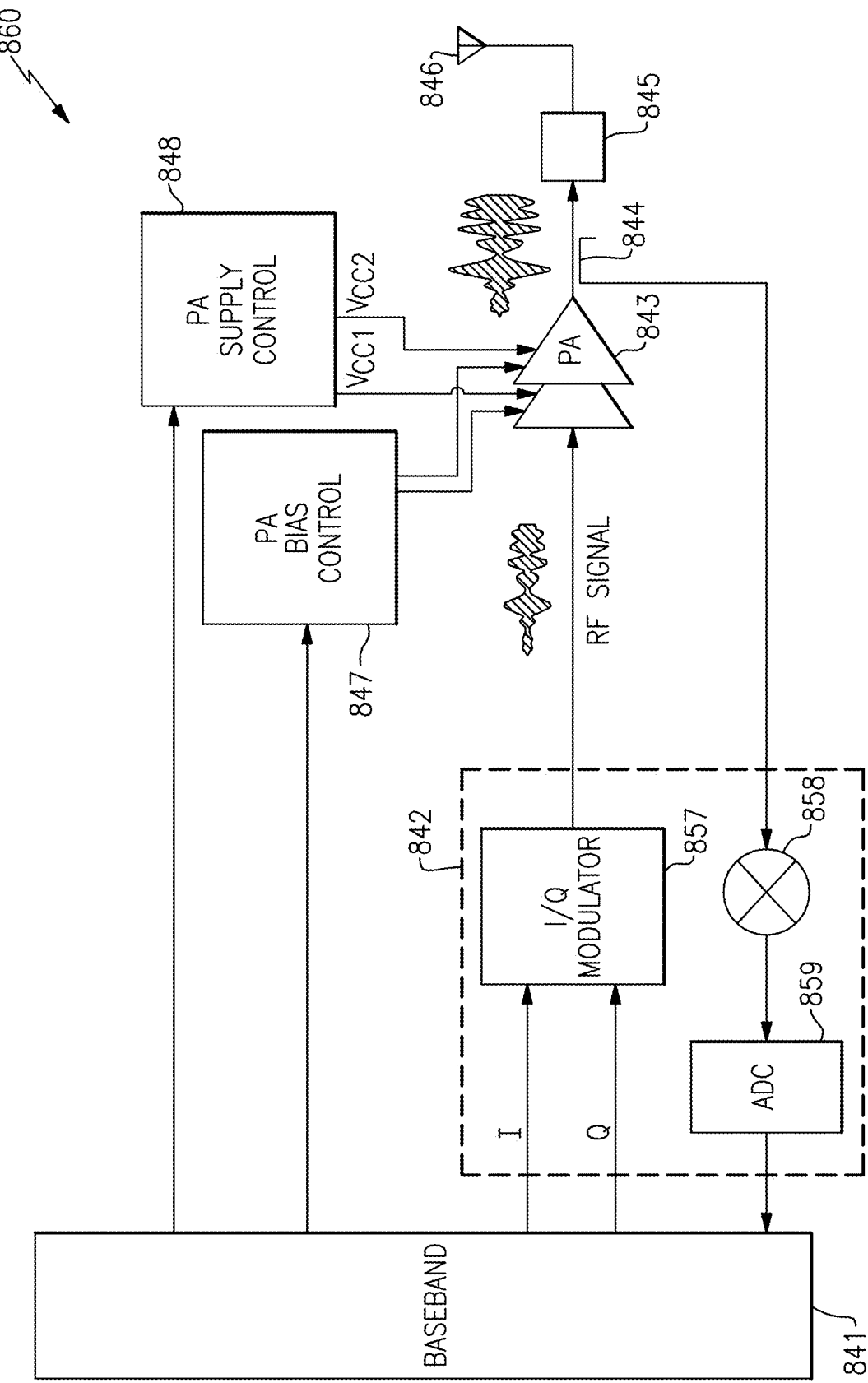
FIG. 8 is a schematic diagram of a power amplifier system according to one embodiment.

FIG. 8 is a schematic diagram of a power amplifier system 860 according to one embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver. The power amplifier system 860 can be included in UE, and corresponds to one example of a transmit chain that can transmit the symbols herein. Although one example of a transmit chain is shown, any suitable transmit chain can be used for transmitting RF signals.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave.

In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, duplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 8, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of testing fifth generation cellular user equipment, the method comprising:
   transmitting a first symbol with a first resource block allocation using a transmit chain of a mobile device;
   transmitting a second symbol with a second resource block allocation different than the first resource block allocation using the transmit chain, the first symbol and the second symbol having a power transient separated by a transient period; and
   establishing that the mobile device complies with a transient period specification based on obtaining a first error vector magnitude measurement and a second error vector magnitude measurement when the mobile device is transmitting a symbol sequence that includes the first symbol and the second symbol, the second error vector magnitude measurement delayed from the first error vector magnitude measurement by an error vector measurement exclusion period.

2. The method of claim 1 further comprising establishing compliance with the transient period specification based on a minimum of the first error vector magnitude measurement and the second error vector magnitude measurement.

3. The method of claim 1 wherein the transient period is about 2 microseconds and the sub-carrier spacing of the second symbol is about 60 kilohertz.

4. The method of claim 1 further comprising setting a window position for the first symbol into a cyclic prefix of the symbol sequence.

5. The method of claim 1 wherein the first symbol is longer than the second symbol.

6. The method of claim 1 wherein the error vector measurement exclusion period starts when the first symbol is still being transmitted.

7. The method of claim 1 wherein the sub-carrier spacing of the second symbol is greater than or equal to 60 kilohertz.

8. The method of claim 1 further comprising transmitting the symbol sequence over a frequency band in frequency range one of fifth generation.

9. The method of claim 1 further comprising transmitting the symbol sequence over a frequency band in frequency range two of fifth generation.

10. The method of claim 9 wherein a sub-carrier spacing the second symbol is one of 60 kilohertz, 120 kilohertz, 480 kilohertz, or 960 kilohertz.

11. The method of claim 9 wherein the transient period is one of 2 microseconds, 1 microsecond, 500 nanoseconds, 250 nanoseconds, or 125 nanoseconds.

12. The method of claim 1 further comprising establishing compliance with the transient period specification based on an error vector magnitude relaxation.

13. The method of claim 1 wherein obtaining the first error vector magnitude measurement includes performing a first fast Fourier transform on data captured when the mobile device is transmitting the first symbol, and obtaining the second error vector magnitude measurement includes performing a second fast Fourier transform on data captured when the mobile device is transmitting the second symbol.

14. The method of claim 1 wherein a ratio of the second resource block allocation to the first resource block allocation is at least twenty to one.

15. The method of claim 1 wherein the first error vector magnitude measurement is taken over a first time window and the second error vector magnitude measurement is taken over a second time window.

16. Automated test equipment for testing fifth generation cellular user equipment, the automated test equipment comprising:

a measurement device configured to generate a receive signal in response to a mobile device transmitting a symbol sequence including a first symbol with a first resource block allocation and a second symbol with a second resource block allocation, the first symbol and the second symbol having a power transient separated by a transient period; and a signal analyzer configured to analyze the receive signal to establish that the mobile device complies with a transient period specification based on obtaining a first error vector magnitude measurement and a second error vector magnitude measurement when the mobile device is transmitting the symbol sequence, the second error vector magnitude measurement delayed from the first error vector magnitude measurement by an error vector measurement exclusion period.

17. The automated test equipment of claim 16 wherein the signal analyzer is further configured to establish compliance based on determining a minimum of the first error vector magnitude measurement and the second error vector magnitude measurement.

18. The automated test equipment of claim 16 further comprising a symbol scheduler configured to set the transient period to a particular value for a particular test case.

19. The automated test equipment of claim 16 further comprising a symbol scheduler configured to set a window position for the first symbol into a cyclic prefix of the symbol sequence.

20. The automated test equipment of claim 16 wherein the error vector measurement exclusion period starts when the first symbol is still being transmitted.

* * * * *